(12) United States Patent
Siomina et al.

(10) Patent No.: US 11,202,303 B2
(45) Date of Patent: Dec. 14, 2021

(54) WIRELESS DEVICE, NETWORK NODE, AND METHODS PERFORMED THEREBY FOR HANDLING A COMMUNICATION OF BLOCKS OF PHYSICAL CHANNELS OR SIGNALS

(71) Applicant: Telefonaktiebolaget LM Ericsson (publ), Stockholm (SE)

(72) Inventors: Iana Siomina, Täby (SE); Robert Baldemair, Solna (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 143 days.

(21) Appl. No.: 16/609,924

(22) PCT Filed: May 3, 2018

(86) PCT No.: PCT/SE2018/050455
§ 371 (c)(1),
(2) Date: Oct. 31, 2019

(87) PCT Pub. No.: WO2018/203814
PCT Pub. Date: Nov. 8, 2018

(65) Prior Publication Data
US 2020/0120691 A1    Apr. 16, 2020

Related U.S. Application Data

(60) Provisional application No. 62/501,148, filed on May 4, 2017.

(51) Int. Cl.
*H04W 72/12* (2009.01)
*H04W 72/04* (2009.01)
*H04L 5/00* (2006.01)

(52) U.S. Cl.
CPC ....... *H04W 72/1247* (2013.01); *H04L 5/0053* (2013.01); *H04L 5/0094* (2013.01); *H04W 72/042* (2013.01); *H04W 72/0446* (2013.01)

(58) Field of Classification Search
None
See application file for complete search history.

(56) References Cited

U.S. PATENT DOCUMENTS

| 2016/0073400 A1 | 3/2016 | Sundberg et al. |
| 2017/0118055 A1 | 4/2017 | Guey et al. |

(Continued)

FOREIGN PATENT DOCUMENTS

| WO | 2016130175 A1 | 8/2016 |
| WO | 2017050500 A1 | 3/2017 |
| WO | 2018137188 A1 | 8/2018 |

OTHER PUBLICATIONS

Author Unknown, Numerology configuration in NR, Doc, No. R2-1703330, pp. 1-6, pp. 1-6 Apr. 1 (Year: 2017).*

(Continued)

*Primary Examiner* — Christopher M Crutchfield
(74) *Attorney, Agent, or Firm* — Murphy, Bilak & Homiller, PLLC

(57) ABSTRACT

A method for handling a communication of blocks of physical channels or signals. A wireless device (130) operating in a wireless communications network (100) obtains (702) an indication for communication of a first number (N) of blocks of physical channels or signals, the blocks operating with different numerologies during at least partly overlapping time resources. The indication is a configuration or a scheduling. The wireless device (130) then determines (703) a second number (N, Nmax, Nmax_dl, Nmax_ul) of the blocks to communicate during a first set of at least partly overlapping time resources. The determining (703) is based on the obtained indication and a capability of the wireless (Continued)

device (130) to communicate a maximum number (Nmax, Nmax_dl, Nmax_ul) of blocks operating with different numerologies during at least partly overlapping time resources. The wireless device (130) then communicates (704) the determined second number of the blocks during the first set of at least partly overlapping time resources.

23 Claims, 13 Drawing Sheets

(56) References Cited

U.S. PATENT DOCUMENTS

| | | | |
|---|---|---|---|
| 2018/0035421 A1* | 2/2018 | Lin | H04W 74/0833 |
| 2018/0199228 A1* | 7/2018 | Phan | H04L 69/18 |
| 2018/0279229 A1* | 9/2018 | Dinan | H04W 52/367 |
| 2018/0279289 A1* | 9/2018 | Islam | H04W 72/0446 |
| 2019/0357226 A1* | 11/2019 | Lin | H04W 72/02 |
| 2020/0022131 A1* | 1/2020 | Li | H04W 8/24 |
| 2020/0136882 A1* | 4/2020 | Jo | H04L 27/2666 |
| 2020/0322925 A1* | 10/2020 | Takeda | H04L 27/2605 |
| 2021/0153180 A1* | 5/2021 | Park | H04W 72/042 |

OTHER PUBLICATIONS

Unknown, Author, "New WID on New Radio Access Technology", 3GPP TSG RAN Meeting #75, RP-170847, Dubrovnik, Croatia, Mar. 6-9, 2017, pp. 1-8.

* cited by examiner a)

b)

a)

b)

WIRELESS DEVICE, NETWORK NODE, AND METHODS PERFORMED THEREBY FOR HANDLING A COMMUNICATION OF BLOCKS OF PHYSICAL CHANNELS OR SIGNALS

TECHNICAL FIELD

The present disclosure relates generally to a wireless device and methods performed thereby for handling a communication of blocks of physical channels or signals. The present disclosure also relates generally to a network node, and methods performed thereby for handling a communication of blocks of physical channels or signals. The wireless device and the network node operate in a wireless communications network.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

NR Architecture

The so-called 5G system, from a radio perspective, started to be standardized in 3GPP, and the so-called New Radio (NR) is the name for the radio interface. One of the characteristics is the frequency range going to higher frequencies than LTE, e.g., above 6 GHz, where it is known to have more challenging propagation conditions such as a higher penetration loss. To mitigate some of these effects, multi-antenna technologies such as beamforming may be massively used in the future. Yet another NR characteristic may be understood to be the use of multiple numerologies in DL and UL in a cell, or for a UE, and/or in different frequency bands. Yet another characteristic may be understood to be the possibility to enable shorter latencies.

NR architecture is being discussed in 3GPP, and the current concept is illustrated in FIG. 1. FIG. 1 is a schematic diagram illustrating a non-limiting example of a NR architecture, where eNB denotes LTE eNodeB, gNB denotes NR BS, where one NR BS may correspond to one or more transmission/reception points, and the lines between the nodes illustrate the corresponding interfaces which are under discussion in 3GPP. EPC denotes the Evolved Packet Core, and the core network of 5G is denoted NextGen Core.

FIG. 2 is a schematic diagram illustrating non-limiting examples of NR deployment scenarios with NR BS which are discussed in 3GPP: non-centralized, co-sited, centralized and shared.

Both standalone and non-standalone NR deployments will be standardized in 3GPP. A standalone deployment may be understood as an NR cell where a UE may perform initial access, camp, in idle or inactive state, or operate in connected state. In that case, the gNodeB, that is, the node managing the NR cell, may be connected to the 5G core network (5GC). It may be noted that eLTE is an LTE version that may also be connected to the 5G core network. In NR standalone operation, there may be deployments where eLTE and NR share the same core network, that is, they may be connected to the 5GC. The standalone deployments may be single or multi-carrier, e.g., NR CA or dual connectivity with NR PCell and NR PSCell. The non-standalone deployments are currently meant to describe a deployment with LTE PCell and a NR PSCell, although there may also be one or more LTE SCells and one or more NR SCells.

The following deployment options are explicitly captured in NR Work Item Description RP-170847, New WID on New Radio Access Technology, NTT DoCoMo, March 2018:

This work item is aimed at supporting the following connectivity options:

For single connectivity option:
   NR connected to 5G-CN (Option 2 in TR 38.801 section 7.1).
For Dual Connectivity options:
   E-UTRA-NR DC via EPC where the E-UTRA is the master (Option 3/3a/3× in TR 38.801 section 10.1.2);
   E-UTRA-NR DC via 5G-CN where the E-UTRA is the master (Option 7/7a/7× in TR 38.801 section 10.1.4);
   NR-E-UTRA DC via 5G-CN where the NR is the master (Option 4/4A in TR 38.801 section 10.1.3)
      Work on Option 4/4A will be started after the work on Option 2, 3 series and 7 series are completed.
. . .

The case of dual Connectivity between Evolved Universal Mobile Telecommunications System Terrestrial Radio Access (E-UTRA) and NR, also called EN-DC may be considered of particular interest, for which the priority is where E-UTRA, that is, LTE connected to EPC, is the Master Node (MN), while e.g., NR is the Secondary node (SN), and the second priority is where NR is the master, and Dual Connectivity may be established within NR.

NR Numerology

NR numerology is being discussed in 3GPP. The term numerology may be understood as referring to a configuration of waveform parameters, such as subcarrier spacing and cyclic prefix. Numerology may be understood to be relevant, for example, to guarantee orthogonality, that is, lack of interference, between the different subcarriers. The configuration of waveform parameters may be understood to vary based on the frequency band used for transmission, as interference may change based on them, and e.g., deployment model, that is, if high interference is expected or not, based on for example, for close or far apart cells may be.

The term "numerology" herein may comprise, e.g., any one or more of: frame duration, subframe or Transmission Time Interval (TTI) duration, slot or minislot duration, symbol duration and the number of symbols per slot and subframe, subcarrier spacing, sampling frequency, Fast Fourier Transform (FFT) size, number of subcarriers per Resource Block (RB) and RB bandwidth, number of RBs within a bandwidth, symbols per subframe, Cyclic Prefix (CP) length, etc.

The exact values for the numerology elements in different radio access technologies are typically driven by performance targets, e.g., performance requirements impose constraints on usable subcarrier spacing sizes, e.g., the maximum acceptable phase noise and the slow decay of the spectrum, impacting filtering complexity and guardband sizes, may set the minimum subcarrier bandwidth for a given carrier frequency, and the required cyclic prefix may set the maximum subcarrier bandwidth for a given carrier frequency.

However, the numerology used so far in the existing RATs is rather static and typically may be trivially derived by the UE, e.g., by one-to-one mapping to RAT, carrier frequency, service type, e.g., Multimedia Broadcast and Multicast Service (MBMS), etc.

In LTE downlink which is Orthogonal Frequency Division Multiplexing (OFDM)-based, the subcarrier spacing may be 15 kHz for normal CP, and 15 kHz and 7.5 kHz, that is, the reduced carrier spacing, for extended CP, where the latter may be allowed only for MBMS-dedicated carriers.

In NR, which is to be based on OFDM, multiple numerologies may be supported for general operation. This may be understood to be to support the co-existence of different services which may be using different yet neighboring frequency bands. A scaling approach, based on a scaling factor $2^n$, $n \subseteq N\_0$, is considered for deriving subcarrier spacing candidates for NR: 3.75 kHz, 7.5 kHz, 15 kHz, 30 kHz, 60 kHz, etc. It has also been agreed that multiplexing different numerologies within a same NR carrier bandwidth may be supported, and Frequency-Division Multiplexing (FDM) and/or Time-Division Multiplexing (TDM) multiplexing may be considered. Yet another agreement is that the numerology used may be selected independently of the frequency band, although it may be assumed that a very low subcarrier spacing may not be used at very high carrier frequencies.

FIG. 3 is a schematic diagram illustrating a non-limiting example of subcarrier spacing candidate configurations for NR. The diagram illustrates how subcarrier spacing may vary based on whether the transmission frequency is low, medium or high, and whether the cell size in the deployment is small, medium or large. In general, it may be observed that at higher frequencies, expected interference is higher, and so is the proposed subcarrier spacing. At low frequencies, however, interference may be also higher in deployments with small cells, where higher subcarrier spacing may be also recommended. For some combinations of frequency and cell size, multiple subcarrier spacings may be used, based on particular deployment scenarios, e.g., based on expected interference in a particular deployment.

It has been further agreed that multiple frequency/time portions using different numerologies may share a synchronization signal, where the synchronization signal refers to the signal itself, and the time-frequency resource used to transmit the synchronization signal. This may be understood to be, so that different wireless devices using services that may require different numerologies may obtain their synchronization signal, without requiring the transmission of too many different synchronization signals, which would represent a waste of time-frequency resources. This may be understood to be because transmission of synchronization signals may require the wireless devices to monitor their transmission and perform measurements, while other transmissions may need to not be performed to avoid interference with the measurements.

According to recent 3GPP agreements, there may be one pre-defined numerology per frequency range for Synchronization Signal (SS) blocks comprising Primary Synchronization Signals (PSS), Secondary Synchronization Signals (SSS), and Physical Broadcast Channel (PBCH), e.g., 15 kHz or 30 kHz subcarrier spacing for below 6 GHz and 120 kHz and 240 kHz subcarrier spacing for 6 GHz and above, but multiple numerologies may need to be supported for data and control channels. Multiple numerologies may also be needed for some reference signals such as Channel State Information Reference Signals (CSI-RS) signals.

Existing methods for a wireless device to handle communications related to multiple numerologies in parallel may result in communication procedures in a network, such as mobility, being adversely affected.

SUMMARY

It is an object of embodiments herein to improve the handling of communications by a wireless device in a wireless communications network. It is a particular object of embodiments herein to improve the handling of communications related to multiple numerologies in parallel, in a wireless communications network.

According to a first aspect of embodiments herein, the object is achieved by a method, performed by a wireless device. The method is for handling a communication of blocks of physical channels or signals. The wireless device operates in a wireless communications network. The wireless device obtains an indication for communication of a first number N of blocks of physical channels or signals. The blocks operate with different numerologies during at least partly overlapping time resources. The indication is at least one of: a configuration and a scheduling. The wireless device then determines a second number N, Nmax, Nmax_dl, Nmax_ul of the blocks of physical channels or signals to communicate during a first set of at least partly overlapping time resources. The determining is based on the obtained indication and a capability of the wireless device to communicate a maximum number Nmax, Nmax_dl, Nmax_ul of blocks of physical channels or signals, the blocks operating with different numerologies during at least partly overlapping time resources. The wireless device also communicates the determined second number N, Nmax, Nmax_dl, Nmax_ul of the blocks of physical channels or signals during the first set of at least partly overlapping time resources. The blocks operate with different numerologies during at least partly overlapping time resources.

According to a second aspect of embodiments herein, the object is achieved by a method, performed by a network node. The method is for handling a communication of blocks of physical channels or signals by the wireless device. The network node and the wireless device operate in the wireless communications network. The network node obtains, from the wireless device, a first indication of the capability of the wireless device. The capability is to communicate the maximum number Nmax, Nmax_dl, Nmax_ul of blocks of physical channels or signals, the blocks operating with different numerologies during at least partly overlapping time resources. The network node then determines a second indication for communication by the wireless device of the first number N of blocks of physical channels or signals, the blocks operating with different numerologies during at least partly overlapping time resources. The second indication is at least one of: the configuration and the scheduling. The determining is based on the obtained first indication.

According to a third aspect of embodiments herein, the object is achieved by a wireless device. The wireless device is configured to handle the communication of blocks of physical channels or signals. The wireless device is configured to operate in the wireless communications network. The wireless device is further configured to obtain the indication configured to be for communication of the first number N of blocks of physical channels or signals, the blocks being configured to operate with different numerologies during at least partly overlapping time resources. The indication is configured to be at least one of: the configuration and the scheduling. The wireless device is also configured to determine the second number N, Nmax_dl, Nmax_ul of the blocks of physical channels or signals to communicate during the first set of at least partly overlapping time resources. To determine is configured to be based on the indication configured to be obtained, and the capability of the wireless device to communicate a maximum number Nmax, Nmax_dl, Nmax_ul of blocks of physical channels or signals, the blocks being configured to operate with different numerologies during at least partly overlapping time resources. The wireless device is further configured to communicate the second number N, Nmax, Nmax_dl, Nmax_ul, configured to be determined, of the blocks of physical channels or signals during the first set of at least partly overlapping time resources, the blocks being configured to operate with different numerologies during at least partly overlapping time resources.

According to a fourth aspect of embodiments herein, the object is achieved by the network node configured to handle the communication of blocks of physical channels or signals by the wireless device. The network node and the wireless device are configured to operate in the wireless communications network. The network node is further configured to obtain, from the wireless device the first indication of the capability of the wireless device to communicate the maximum number Nmax, Nmax_dl, Nmax_ul of blocks of physical channels or signals, the blocks being configured to operate with different numerologies during at least partly overlapping time resources. The network node is further configured to determine the second indication for communication by the wireless device of the first number N of blocks of physical channels or signals, the blocks being configured to operate with different numerologies during at least partly overlapping time resources. The second indication is configured to be at least one of: the configuration and the scheduling. To determine is based on the first indication configured to be obtained.

By the wireless device determining the second number of the blocks of physical channels or signals to communicate during a first set of at least partly overlapping time resources, based on the obtained indication and the capability of the wireless device to communicate the maximum number of blocks, the wireless device is enabled to support multiple numerologies in DL and UL, while still ensuring that the wireless device is able to receive and transmit necessary blocks containing all necessary or important signals.

These advantages may be facilitated by the network node determining and then sending the determined second indication to the wireless device, thereby enabling to optimize scheduling of signals in UL and DL. For example, the scheduling grants may be utilized more efficiently.

Therefore, procedures such as mobility based on measurements are not adversely affected due to the use of multiple numerologies.

BRIEF DESCRIPTION OF THE DRAWINGS

Examples of embodiments herein are described in more detail with reference to the accompanying drawings, and according to the following description.

DETAILED DESCRIPTION

Figure 1:
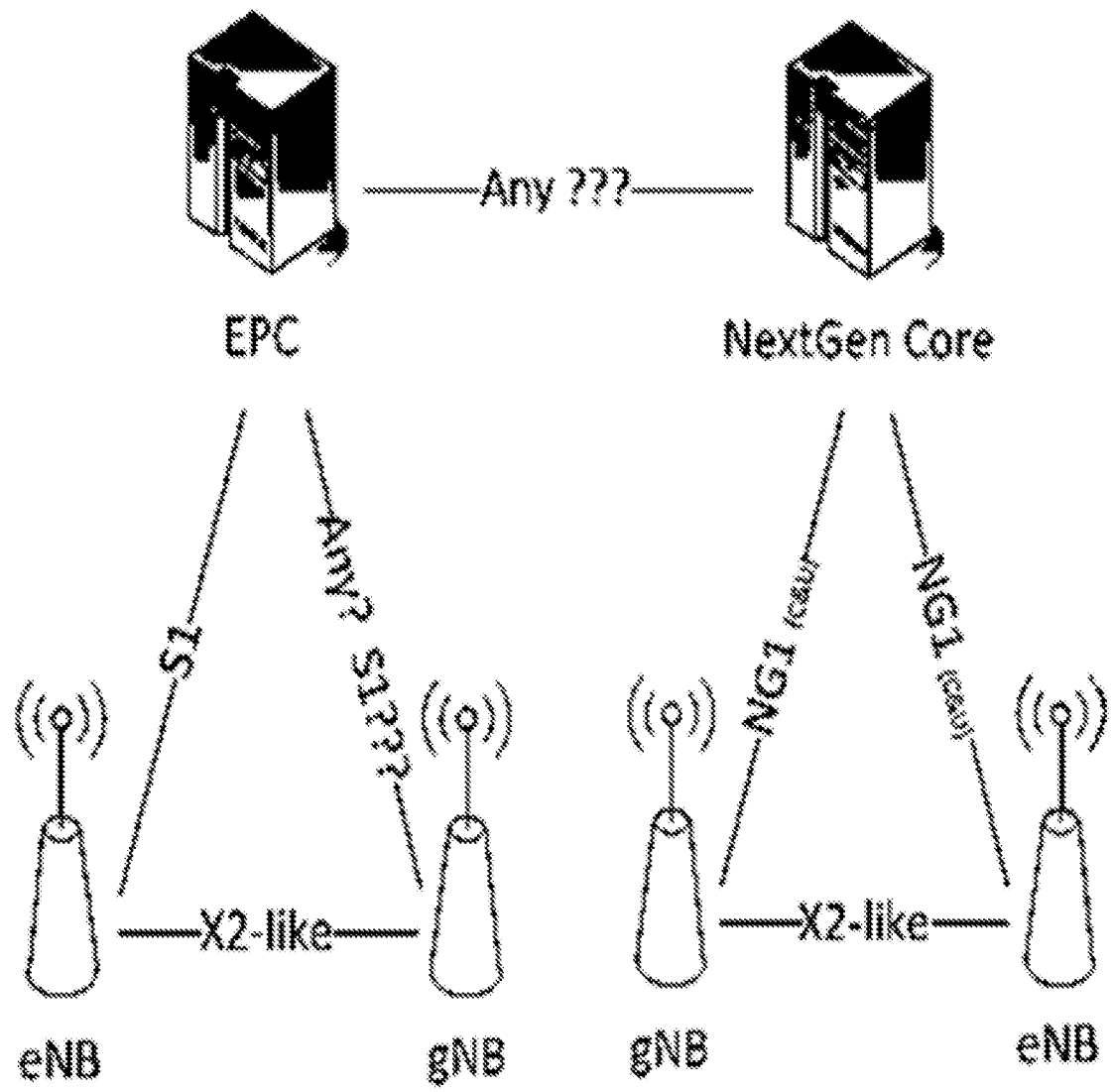
FIG. 1 is a schematic diagram illustrating a non-limiting example of a NR architecture.
Figure 2:
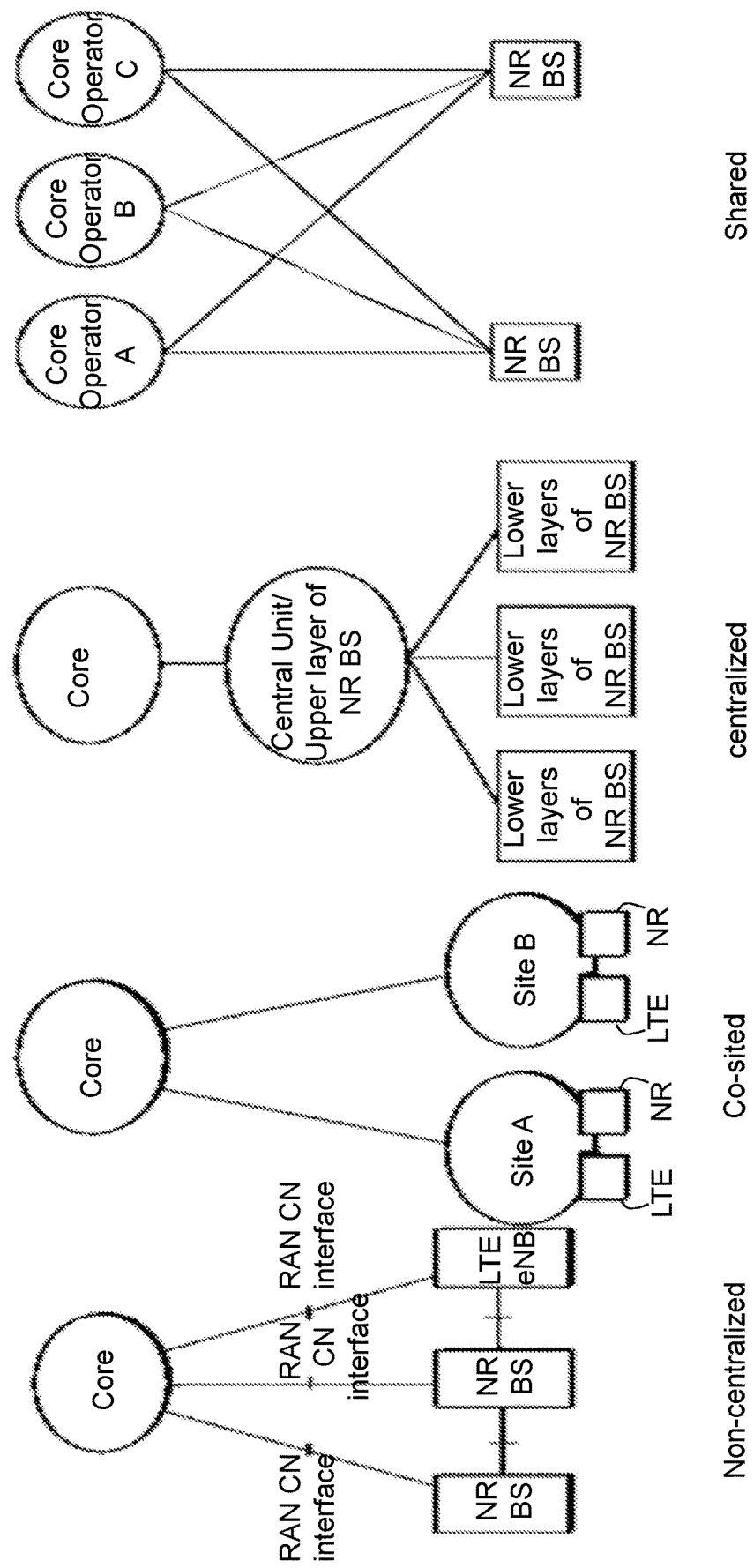
FIG. 2 is a schematic diagram illustrating non-limiting examples of NR deployment.
Figure 3:
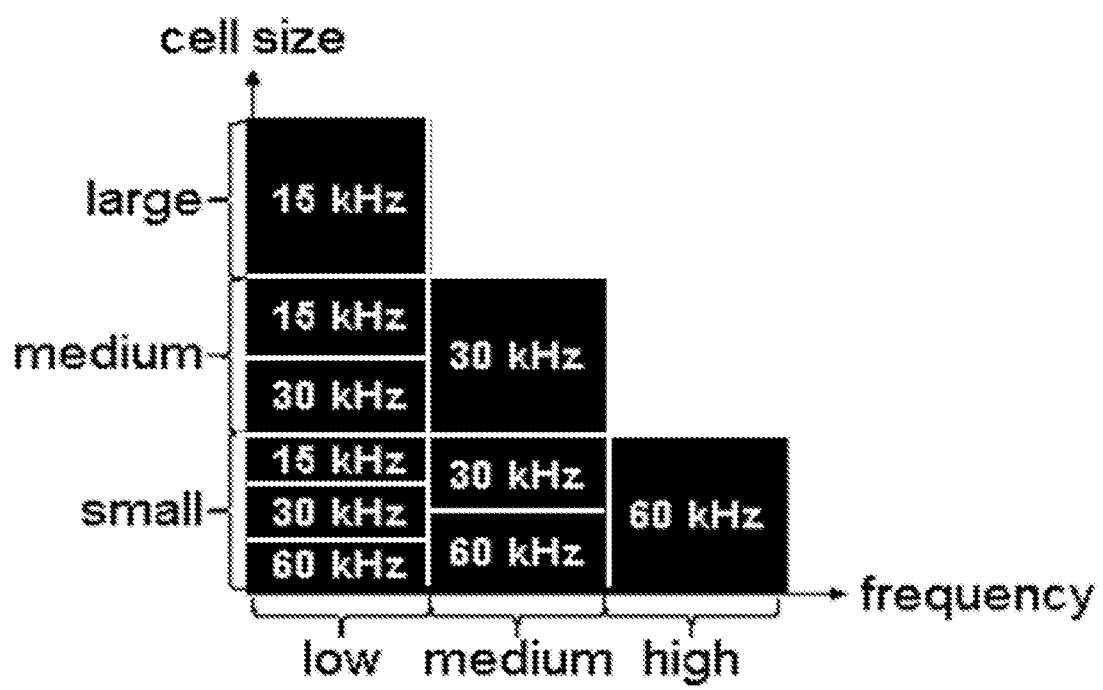
FIG. 3 is a schematic diagram illustrating a non-limiting example of subcarrier spacing candidate configurations for NR.

As part of the development of embodiments herein, one or more problems with the existing technology will first be identified and discussed.

At least the following problems may be envisioned with the existing solutions. As discussed in the background section, in NR, multiple numerologies are planned to be supported for general operation. However, not all UEs are likely to have the same ability to handle different numerologies in the frequency domain. Therefore, UEs not supporting different numerologies may not be able to receive certain transmissions if more than one numerology is used, and time-frequency resources may be wasted in transmissions they may not be able to receive. Given the projected future volume of communication traffic in wireless networks, and the limited carrier capacity, the efficient usage of time-frequency resources becomes especially relevant.

To always avoid configuring transmissions with different numerologies in resources overlapping in time, to therefore allow that all UEs whether they may support multiple numerologies or not may receive their transmissions, is not an efficient approach. For example, some signals with a first numerology may be UE-specific, while other signals with a second numerology may be common for multiple UEs. Since, the UEs to whom the UE specific signals may be addressed may be able to handle multiple numerologies in resources overlapping in time, while other UEs may that may only need to receive the common signals may not, avoiding configuring transmissions with different numerologies in resources overlapping in time, would be a waste of time-frequency resources. This is because the UEs capable of receiving signals with multiple numerologies would be able to handle the transmissions with the multiple numerologies, and the UEs not capable of doing that would not be targeted anyway. Consequently, this makes it challenging to always avoid configuring transmissions with different numerologies in resources overlapping in time, while maintaining system flexibility and ensuring efficient resource utilization.

In order to address these problems, several embodiments are comprised herein. As a summarized overview, embodiments herein may be understood to relate to methods in a UE and a network node. Particular embodiments herein may be understood to relate to methods of controlling UE operations based on multiple numerologies with frequency domain multiplexing.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Terminology

In some embodiments a non-limiting term "UE" is used. The UE herein may be any type of wireless device capable of communicating with a network node or another UE over radio signals. The UE may also be radio communication device, target device, device to device (D2D) UE, machine type UE or UE capable of machine to machine communication (M2M), a sensor equipped with UE, an iPad, Tablet, mobile terminal, smart phone, laptop embedded equipped (LEE), laptop mounted equipment (LME), USB dongles, Customer Premises Equipment (CPE), etc.

Also in some embodiments the generic terminology "network node" is used. It may be any kind of network node, which may comprise a radio network node, such as a base station, radio base station, base transceiver station, base station controller, network controller, gNB, NR BS, evolved Node B (eNB), Node B, Multi-cell/multicast Coordination Entity (MCE), relay node, access point (AP), radio access point, Remote Radio Unit (RRU), Remote Radio Head (RRH), a multi-standard BS, a.k.a. MSR BS, a core network node, e.g., a Mobility Management Entity (MME), Self-Organizing Network (SON) node, a coordinating node, positioning node, Evolved Serving Mobile Location Center (E-SMLC), Minimization of Drive Test (MDT) node, etc., or even an external node, e.g., a 3rd party node, a node external to the current network, etc. The network node may also comprise a test equipment.

The term "radio node" used herein may be used to denote a UE or a radio network node.

The term "signaling" used herein may comprise any of: high-layer signaling, e.g., via Radio Resource Control (RRC) or the like, lower-layer signaling, e.g., via a physical control channel or a broadcast channel, or a combination thereof. The signaling may be implicit or explicit. The signaling may further be unicast, multicast or broadcast. The signaling may also be directly to another node or via a third node. The term "radio measurement" used herein may refer to any measurement performed on radio signals. Radio measurements may be absolute or relative. Radio measurement may be referred to as a signal level, which may be signal quality and/or signal strength. Radio measurements may be e.g., intra-frequency, inter-frequency, inter-RAT measurements, Carrier Aggregation (CA) measurements, etc. Radio measurements may be unidirectional, e.g., DL or UL, or bidirectional, e.g., Round-Trip Time (RTT), Reception-Transmission (Rx-Tx), etc. Some examples of radio measurements may be: timing measurements, e.g., Time of Arrival (TOA), timing advance, RTT, Reference Signal Time Difference (RSTD), Rx-Tx, propagation delay, etc., angle measurements, e.g., angle of arrival, power-based measurements, e.g., received signal power, Reference Signal Receive Power (RSRP), received signal quality, Reference Signal Receive Quality (RSRQ), Signal to Interference Noise Ratio (SINR), Signal To Noise Ratio (SNR), interference power, total interference plus noise, Received Signal Strength Indicator (RSSI), noise power, etc., cell detection or cell identification, radio link monitoring (RLM), system information (SI) reading, etc. The inter-frequency and inter-Radio Access Technology (RAT) measurements may be carried out by the UE in measurement gaps, unless the UE is capable of doing such measurements without gaps. Examples of measurement gaps are measurement gap id #0, e.g., each gap of 6 ms occurring every 40 ms, measurement gap id #1, e.g., each gap of 6 ms occurring every 80 ms, etc. The measurement gaps may be configured at the UE by the network node.

Performing a measurement on a carrier may imply performing measurements on signals of one or more cells operating on that carrier or performing measurements on signals of the carrier, a.k.a. carrier specific measurement, e.g., RSSI. Examples of cell specific measurements are signal strength, signal quality etc.

The term measurement performance used herein may refer to any criteria or metric which may characterize the performance of the measurement performed by a radio node. The term measurement performance may be also referred to as measurement requirement, measurement performance requirements, etc. The radio node may have to meet one or more measurement performance criteria related to the performed measurement. Examples of measurement performance criteria are measurement time, number of cells to be measured with the measurement time, measurement reporting delay, measurement accuracy, measurement accuracy with respect to a reference value, e.g., ideal measurement result, etc. Examples of measurement time are measurement period, cell identification period, evaluation period, etc.

As was stated earlier, the term "numerology" herein may comprise, e.g., any one or more of: frame duration, subframe or TTI duration, slot or minislot duration, symbol duration and the number of symbols per slot and subframe, subcarrier spacing, sampling frequency, FFT size, number of subcarriers per RB and RB bandwidth, number of RBs within a bandwidth, symbols per subframe, CP length, etc.

Note that although terminology from 5G and 3GPP LTE has been used in this disclosure to exemplify the embodiments herein, this should not be seen as limiting the scope of the embodiments herein to only the aforementioned system. Other wireless systems, may also benefit from exploiting the ideas covered within this disclosure.

Figure 4:
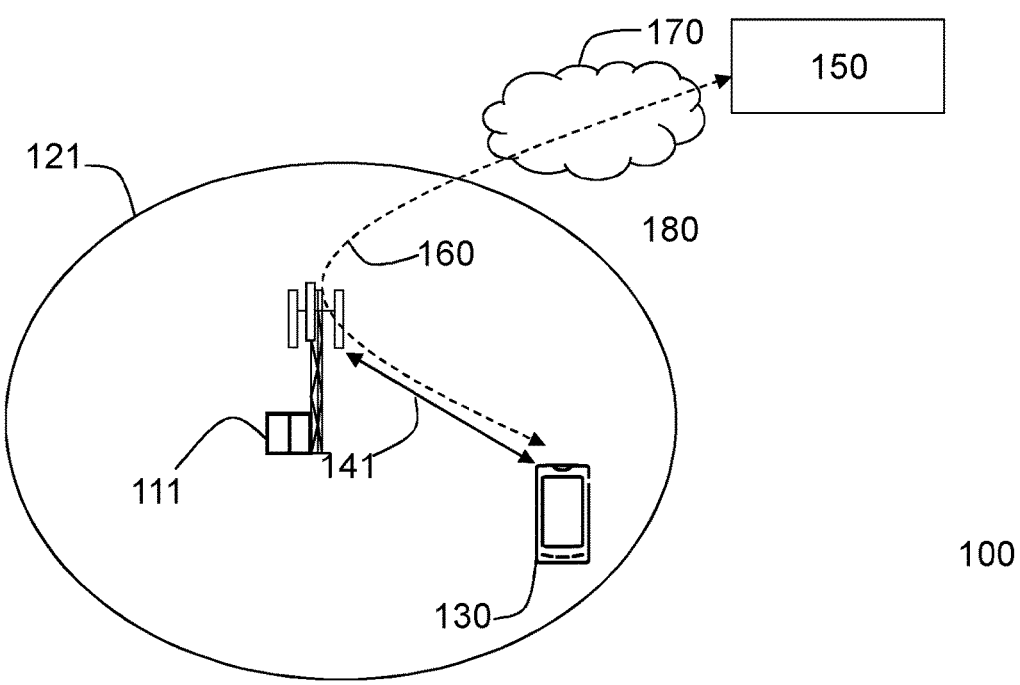
FIG. 4 is a schematic diagram illustrating non-limiting examples of transmissions with two blocks during at least partly overlapping time resources.
Figure 4:
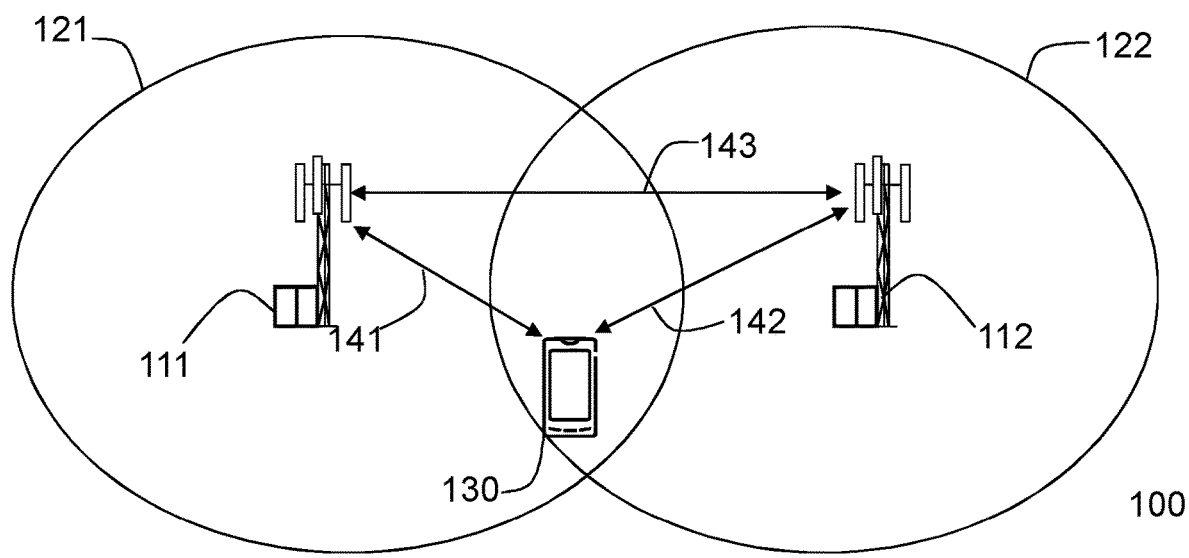

FIG. 4 depicts two non-limiting examples, in FIGS. 4a, and 4b respectively, of a wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GERAN network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system. The wireless communications network may also be understood as a non-cellular system, comprising network nodes which may serve receiving nodes, such as wireless devices, with serving beams. This may be a typical case, e.g., a in a 5G network.

The wireless communications network 100 comprises a plurality of network nodes, whereof a network node 111, also referred to herein as a first network node 111, and another network node 112, also referred to herein as a second network node 112, are depicted in the non-limiting examples of FIG. 4. Each of the network node 111, and the another network node 112 may be radio network nodes. In a non-limiting scenario, depicted in FIG. 4a and FIG. 4b, the network node 111 and the another network node 112 may be different nodes. In other examples, the network node 111 and the another network node 112 may be co-located, or be the same node. In other examples, which are not depicted in FIG. 4, the network node 111 may be a distributed node, such as a virtual node in the cloud, and may perform its functions entirely on the cloud, or partially, in collaboration with a radio network node.

Each of the network node 111, and the another network node 112 may be gNB. That is, a transmission point such as a radio base station, for example an eNB, an eNodeB, or a Home Node B, an Home eNode B or any other network node capable of serving a wireless device, such as a user equipment or a machine type communication device, in the wireless communications network 100. In some examples, at least one of the network node 111, and the another network node 112 may be a gNB, and the other may be an LTE eNB.

The wireless communications network 100 covers a geographical area which may be divided into cell areas, wherein each cell area may be served by a network node, although, one radio network node may serve one or several cells. The wireless communications network 100 comprises at least a first cell 121, and may comprise at least a second cell 122. In the non-limiting example depicted in FIG. 4, the network node 111 serves the first cell 121, and the another network node 112 serves the second cell 122. Even in examples wherein the wireless communications network 100 may not be referred to as a cellular system, if each of the another network node 112 and the another network node 112 may serve receiving nodes, such as wireless devices, with serving beams, the areas of coverage of the beams may still be referred to as cells. Each of the network node 111, and the another network node 112 may be of different classes, such as, e.g., macro eNodeB, home eNodeB or pico base station, based on transmission power and thereby also cell size. Each of the network node 111, and the another network node 112 may support one or several communication technologies, and its name may depend on the technology and terminology used. In 5G/NR, each of the another network node 112 and the another network node 112, which may be referred to as gNBs, may be directly connected to one or more core networks, which are not depicted in FIG. 4.

A plurality of wireless devices is located in the wireless communication network 100, whereof a wireless device 130, is depicted in the non-limiting examples of FIG. 4. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may comprised within the wireless communications network 100.

The wireless device 130 may be configured to communicate within the wireless communications network 100 with the network node 111 over a first link 141, e.g., a radio link. The wireless device 130 may be configured to communicate within the wireless communications network 100 with the another network node 112 over a second link 142, e.g., a radio link. The network node 111 may be configured to communicate within the wireless communications network 100 with the another network node 112 over a third link 143, e.g., a radio link. It may be noted that in the non-limiting examples of FIG. 4a and FIG. 4b, the third link 143 is represented as a direct link. However, it may be noted that the communication between the network node 111 and the another network node 112 may take place via one or more other radio network nodes or core network nodes.

In some embodiments, the wireless communications network 100 may be connected to a host computer 150, which is depicted in the example of FIG. 4a, but may also be found in examples such as that of FIG. 4b or in other examples of embodiments herein. The host computer 150 may be embodied in the hardware and/or software of a standalone server, a cloud-implemented server, a distributed server or as processing resources in a server farm. The host computer 150 may be under the ownership or control of a service provider, or may be operated by the service provider or on behalf of the service provider. The host computer 150 may communicate with the wireless device 130 via a fourth link 160. The fourth link 160 may comprise one or more wired and wireless links, and extend via, e.g., the cloud 170, the one or more other radio network nodes or core network nodes in the wireless communications network. In some examples, the fourth link 160 may extend via an optional intermediate network, which is not depicted in FIG. 4 to simplify the Figure. The intermediate network may be one of, or a combination of more than one of, a public, private or hosted network; the intermediate network may be a backbone network or the Internet. A connectivity provided by the fourth link 160 may be referred to as an Over the Top (OTT) connection.

The system comprising the host computer 150, and at least one of the network node 111 and the wireless device 130 may be referred to herein as a communications system 180.

In general, the usage of "first", "second", and/or "third", "fourth" and "fifth" herein may be understood to be an arbitrary way to denote different elements or entities, and may be understood to not confer a cumulative or chronological character to the nouns they modify.

Embodiments of methods for handling a communication of blocks of physical channels or signals will be next. The term "block" used herein may comprise signals based on the same numerology. The signal may be a physical signal or a physical channel. A physical signal may be understood to not carry higher layer signaling, while a physical channel may carry higher layer information. A block of signals may comprise any one or more of: an SS block, as described later, synchronization signal, PSS, SSS, PBCH, physical reference signals, CSI-RS, reference signals for time and/or frequency tracking, reference signals for UE positioning, a physical channel, e.g., a data channel, a control channel etc, Sounding Reference Signals (SRS) signals, Random Access CHannel (RACH), etc. Examples of DL physical channels are the Physical Downlink Shared CHannel (PDSCH), the Physical Downlink Control CHannel (PDCCH), the Enhanced Physical Downlink Control Channel (EPDCCH), etc. Examples of UL physical channels are the Physical Uplink Shared CHannel (PUSCH), the Physical Uplink Control CHannel (PUCCH), etc. A block may be a plurality, a group or a limited set of time and/or frequency resources, and may be transmitted once, or according to a pattern, or periodically. A block may be a DL block or UL block.

In one example, the N blocks may be transmitted on the same carrier frequency or in the same frequency band. In a further example, the N blocks may be transmitted in the same cell. In another example, the N blocks may be transmitted in different beams or from different Transmission/Reception Points (TRPs). In yet another example, the N blocks may be transmitted in different cells. In yet another example, the N blocks may be transmitted in two or more carrier frequencies or carrier components (CCs). In yet another example, two blocks may comprise two resource blocks. In yet another example, the N blocks may even be "nested", e.g., a first block comprises a data channel, e.g., PDSCH, and possibly control channels, e.g., PDCCH, in a resource block, e.g., spanning 1 subframe, e.g., 1 ms, and 12 subcarriers counted in the reference numerology associated with the corresponding carrier frequency or frequency range, and a second block comprises resource elements allocated to one or more specific reference signals, e.g., CSI-RS, within the same resource block, transmitted from the same TRP or cell, or within a different resource block, transmitted from a different TRP or cell, overlapping in frequency and time with the first resource block.

Figure 5:
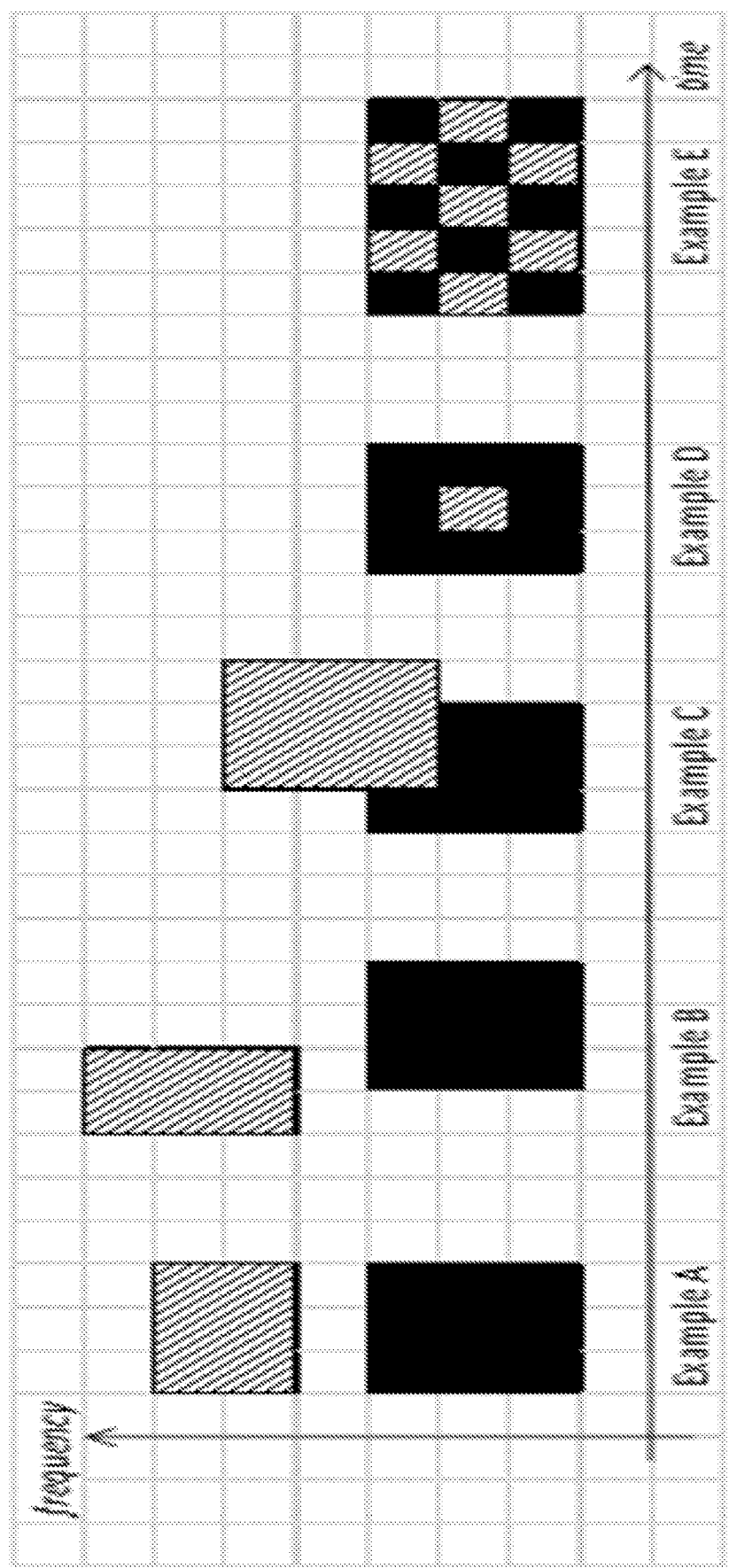
FIG. 5 is a schematic diagram illustrating a non-limiting example configuration of SS blocks, SS bursts and SS burst sets/series.

FIG. 5 is a schematic diagram illustrating non-limiting examples of transmission with 2 blocks in at least partially overlapping time resources. Each block is represented as a box with a same pattern, striped or solid black. The two blocks comprise different frequency bandwidths, as represented by the vertical axis. In Example A, the two blocks are completely overlapping in the time axis, as represented by the horizontal axis. In Example B, the two blocks are partially overlapping in the time axis, that is, they are in partially overlapping time resources. In Example C, the two blocks are in partially overlapping time resources, partially overlapping in both, the time axis and the frequency axis. In Example D, the two blocks are in partially overlapping time resources, as one or the blocks completely overlaps with a part of the time axis and the frequency axis of the other. In Example E, the two blocks are in partially overlapping time resources, as the two blocks overlap in the time axis in different portions. The examples may be understood to be able to be extended to more than 2 blocks, which may or may not consist of resource elements that may be consecutive in time and frequency.

A particular non-limiting example of a block, which may be used as a reference herein, is an SS block.

SS Block Configuration

Herein we describe a non-limiting example of an SS block and an SS burst configuration, which may be assumed in other embodiments. The signals comprised in an SS block may be used for measurements on an NR carrier, including intra-frequency, inter-frequency and inter-RAT, that is, NR measurements from another RAT.

Ss Block:

NR-PSS, NR-SSS and/or NR-PBCH may be transmitted within an SS block. For a given frequency band, an SS block may be understood to correspond to N Orthogonal Frequency Division Multiplexing (OFDM) symbols, based on the default SS block subcarrier spacing, and N may be understood to be a constant. A UE may be able to identify at least an OFDM symbol index, a slot index in a radio frame and a radio frame number from an SS block. A single set of possible SS block time locations, e.g., with respect to radio frame or with respect to an SS burst set, may be specified per frequency band. At least for a multi-beams case, at least the time index of an SS-block may be indicated to the UE. The position(s) of actually transmitted SS-blocks may be informed for helping CONNECTED/IDLE mode measurement, for helping CONNECTED mode UEs to receive DL data/control in unused SS-blocks, and potentially for helping IDLE mode UEs to receive DL data/control in unused SS-blocks.

Ss Burst:

One or multiple SS block(s) may be understood to be comprised in an SS burst. The maximum number of SS-blocks, L, within an SS burst set may be carrier frequency dependent. For example, for frequency range category #A, e.g., 0~6 GHz, the number (L) may be TBD within L? [16]; for frequency range category #B, e.g., 6~60 GHz, the number may be TBD within L? [128].

SS Burst Set:

One or multiple SS burst(s) may be understood to be further comprised in an SS burst set or series, where the number of SS bursts within a SS burst set may be understood to be finite. From a physical layer specification perspective, at least one periodicity of SS burst set may be supported. From a UE perspective, an SS burst set transmission may be understood to be periodic. At least for initial cell selection, a UE may assume a default periodicity of SS burst set transmission of 20 ms. The UE may assume that a given SS block is repeated with a SS burst set periodicity. By default, the UE may be understood to neither assume the gNB transmits the same number of physical beam(s), nor the same physical beam(s) across different SS-blocks within an SS burst set.

For each carrier, the SS blocks may be time-aligned or overlap fully or at least in part, or the beginning of the SS blocks may be time-aligned, e.g., when the actual number of transmitted SS blocks is different in different cells, or distributed in time.

Figure 6:
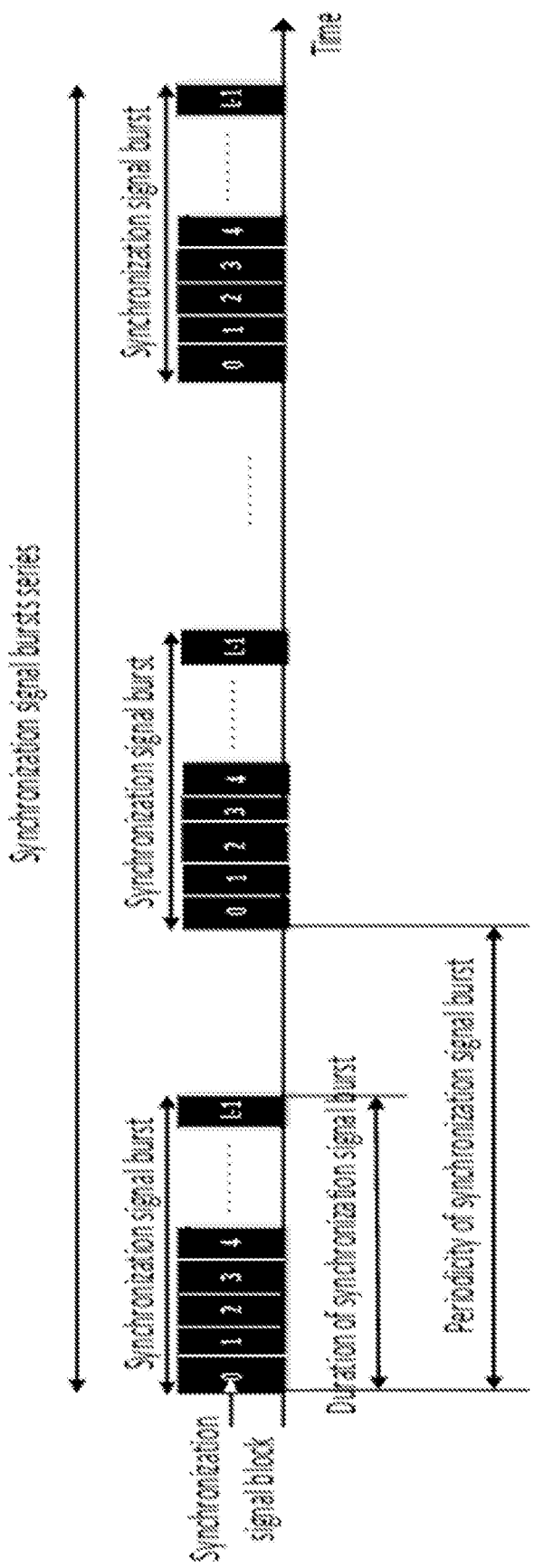
FIG. 6 is a schematic diagram illustrating a wireless communications network, according to embodiments herein.

FIG. 6 is a schematic diagram illustrating a non-limiting example configuration of SS blocks, SS bursts and SS burst sets/series. The SS blocks in this example are grouped in SS bursts, each comprising L SS blocks, which are transmitted for a certain duration. The SS bursts are transmitted with a certain periodicity, as indicated in the Figure by the lowest arrow. Together, the SS bursts comprise an SS series, as also indicated by the top arrow.

Embodiments of a method performed by the wireless device 130, will now be described with reference to the flowcharts depicted in panels a) and b) of FIG. 7, each describing a different order in which the actions herein may be performed. The method is for handling a communication of blocks of physical channels or signals. The wireless device 130 operates in the wireless communications network 100.

In some embodiments all the actions may be performed. In some embodiments, one or more actions may be performed. One or more embodiments may be combined, where applicable. It should be noted that the examples herein are not mutually exclusive. Components from one embodiment may be tacitly assumed to be present in another embodiment and it will be obvious to a person skilled in the art how those components may be used in the other exemplary embodiments. All possible combinations are not described to simplify the description. In FIG. 7, optional actions are indicated with dashed lines. Some actions may be performed in a different order than that shown in panel a) of FIG. 7, as shown for example in an example in panel b) of FIG. 7.

Action 701

In order to inform the network node 111 or the another network node 112 of whether or not the wireless device 130 is able to handle blocks operating with different numerologies during at least partly overlapping time resources, in this Action 701, the wireless device 130 may send a first indication of a capability of the wireless device 130 to at least one of: the network node 111, and the another network node 112 operating in the wireless communications network 100. The capability of the wireless device 130 may be understood to be to communicate a maximum number of blocks of physical channels or signals, the blocks operating with different numerologies during at least partly overlapping time resources.

Communication may be understood herein to be at least one of transmission and reception.

A block may be understood herein as described above. That is, a block may be understood as a set of time-frequency resources, for example, transport format resources. Typically, a block may be one or more Physical Resource Blocks (PRBs). Each block may comprise one or multiple physical channels, or physical channels or signals of the same numerology. Examples of physical channels may be PUSCH, PUCCH, PDCCH, and PDSCH.

Any reference here to blocks of physical channels or signals may be understood to refer to blocks of physical channels, or physical channels or signals.

Physical channels or signals may typically be reference physical channels or signals.

Numerology may be understood e.g., as in 3GPP. Numerology has been further described in the Terminology section above.

A number of blocks of physical channels or signals, the blocks operating with different numerologies that may be communicated by the wireless device 130 during at least partly overlapping time resources may be for example "N". Therefore the maximum number of blocks of physical channels or signals, the blocks operating with different numerologies that may be communicated in by the wireless device 130 during at least partly overlapping time resources may be referred to as, e.g., Nmax. There may also be a maximum number of blocks of physical channels or signals, the blocks operating with different numerologies that may be communicated by the wireless device 130 in the downlink, that is, received, during at least partly overlapping time resources which may be referred to as Nmax_dl, and a maximum number of blocks of physical channels or signals, the blocks operating with different numerologies that may be communicated by the wireless device 130 in the uplink, that is, transmitted, during at least partly overlapping time resources which may be referred to as Nmax_ul, The values of parameters Nmax_dl and Nmax_ul supported by the wireless device 130 may be the same, or they may be different.

The sending in this Action 701 may be implemented, e.g., via the first link 141 to the network node 111, and via the second link 142 to the another network node 112.

By sending its capability, the wireless device 130 enables the network node 111 and/or the another network node 112 to perform their schedulings and/or configurations with respect to the wireless device 130 accordingly.

Action 702

In this Action 702, the wireless device 130, obtains an indication for communication of a first number, e.g., N, of blocks of physical channels or signals, the blocks operating with different numerologies during at least partly overlapping time resources. The indication is at least one of: a configuration and a scheduling.

In the embodiments wherein Action 701 may have been performed, the indication may be understood to be a second indication.

Obtaining in this Action 702 may be understood as receiving and may also involve calculating, deriving, retrieving from a storage, determining, etc.

In some embodiments, the indication is obtained from at least one of: the network node 111, and the wireless device 130. In some embodiments, the wireless device 130 may obtain the indication from the network node 111, e.g., via the first link 141.

By obtaining the second indication in this Action 702, the wireless device 130 may, for example, be configured and/or scheduled to receive signals and/or channels in N blocks (N>1, . . . ), in the same or overlapping time resources, based on N different numerologies, or configured to receive signals and/or channels comprised in the N blocks.

Action 703

After receiving the second indication in Action 702, the wireless device 130 may in this Action 703 check if it may be able to handle the scheduling and/or configuration received, based on its capability. Therefore, in this Action 703, the wireless device 130 determines a second number of the blocks of physical channels or signals to communicate during a first set of at least partly overlapping time resources. The determining in this Action 703 is based on the obtained indication in Action 702, and the capability of the wireless device 130 to communicate the maximum number, e.g., Nmax, Nmax_dl, Nmax_ul, of blocks of physical channels or signals, the blocks operating with different numerologies during at least partly overlapping time resources.

Determining may be understood as e.g., calculating.

The first set of at least partly overlapping time resources may be, e.g., one or more subframes, symbols, slots, mini-slots, etc.

The second number may be, for example, any of N, Nmax, Nmax_dl, or Nmax_ul. That is, if the wireless device 130 has a capability to handle the number of blocks of physical channels or signals operating with different numerologies during at least partly overlapping time resources, N, then the second number may also be N. However, if the wireless device 130 has a capability to handle the number of blocks of physical channels or signals operating with different numerologies during at least partly overlapping time resources, Nmax which is smaller than N, then the determined second number may be Nmax. In such cases, the determining in this Action 703 may further comprise the wireless device 130 selecting the second number of the blocks of physical channels or signals to communicate during the first set of at least partly overlapping time resources.

The selection may be based on one or more of the following. In some embodiments, the selection may be based on a pre-defined rule. For example, the wireless device 130 may select blocks with certain pre-defined numerologies. In another example, the wireless device 130 may select at least one block with a reference signal, e.g., SS block, CSI-RS etc, and at least one block with a physical channel, e.g., PDSCH etc. In another example, a block containing an SS block may be of highest priority, and may never be discarded by the wireless device 130. In yet another example, a block containing an SS block may be allowed to be discarded by the wireless device 130 with a certain periodicity, which may be larger than a certain threshold, e.g., discard one block containing SS not more than once every 40 ms. In yet another example of the rule, the wireless device 130 may receive the block of signals with a physical channel associated with certain numerology, e.g., SCS=30 KHz, provided that the wireless device 130 may have also estimated a CSI for the same numerology, i.e., for SCS=30 KHz.

In some embodiments, the selection may be based on a priority. For example, e.g., prioritize a first block comprising at least a first type of signal/channel over a second block not comprising the first type of signal/channel, or comprising the first type of signal/channel but with a lower density in time and/or frequency compared to the first block. In some specific embodiments, the priority may be obtained from the network node 111, as explained below in Action 705, in a third indication. In such embodiments, in may be understood that Action 705 may be performed prior at Action 703. A particular example of this is depicted in panel b of FIG. 7.

In yet other some embodiments, the selection may be based on a message or configuration received from another node controlling the selection, e.g., the network node 111, and another network node 112. The message or configuration may be considered a fourth indication. The fourth indication may indicate a configuration for the wireless device 130 to refrain from communicating a certain number, e.g., N-Nmax, N-Nmax_dl, N-Nmax_ul, of blocks of physical channels or signals during the first set of the at least partly overlapping time resources. The fourth indication may be received separately or together with the third indication.

Nmax, Nmax_dl, Nmax_ul are used herein as illustrating examples to support the description of embodiments herein. Therefore the usage of any of Nmax, Nmax_dl, Nmax_ul after any term herein may be understood to be for illustrative purposes only and non-limiting.

Action 704

In this Action 704, the wireless device 130 communicates, that is, transmits or receives, the determined second number N, Nmax, Nmax_dl, Nmax_ul of the blocks of physical channels or signals during the first set of at least partly overlapping time resources, the blocks operating with different numerologies during at least partly overlapping time resources.

In the examples, wherein the wireless device 130 may have performed a selection of the second number of the blocks of physical channels or signals to communicate, the wireless device 130 may communicate the selected second number of the blocks of physical channels or signals in this Action 704 during the at least partly overlapping time resources.

Action 705

As discussed earlier, in some cases wherein the determined second number may be lower than the first number, the wireless device 130 may need to select which of the first number of blocks to communicate in Action 704. That is, the wireless device 130 may need to select the determined second number of blocks to communicate in Action 704, as it may not be capable to communicate them all.

For that purpose, in some embodiments, the wireless device 130 may, in this Action 705, obtain, from the network node 111, a third indication of the priority of at least one of the physical channels and signals. That is, of the physical channels, or the physical channels or signals.

In other words, the wireless device 130 may obtain from the network node 111 a priority for at least one signal/channel in case the wireless device 130 is configured with or may need to receive/transmit multiple signals/channels based on different numerologies and the situation N>Nmax may occur.

The obtaining in this Action 705 may be implemented, by receiving the third indication, e.g., via the first link 141.

In may be understood that this Action may be performed before any of the other actions or together with any of the other actions. For example, panel b) of FIG. 7 depicts an example wherein Action 705 is performed before Action 703. If the third indication is received prior to the wireless device 130 communicating the determined second number of blocks, it may be understood that the communicating in Action 704 may be based on the received third indication. That is, that the communicated second number of blocks may have been selected by the wireless device 130 based on their priority.

Action 706

In the cases wherein the determined second number may be lower than the first number, the wireless device 130 may, in this Action 706, refrain from communicating a third number of blocks of physical channels or signals during the first set of at least partly overlapping time resources. The third number may be considered to be equal to the first number N of blocks minus the maximum number Nmax, Nmax_dl, Nmax_ul of blocks. The third number may therefore be referred to as, e.g., N-Nmax, N-Nmax_dl, N-Nmax_ul.

To refrain from communicating may be understood as to not communicate, to discard, or to drop.

N-Nmax, N-Nmax_dl, N-Nmax_ul are used herein as illustrating examples to support the description of embodiments herein. Therefore the usage of any of N-Nmax, N-Nmax_dl, N-Nmax_ul after any term herein may be understood to be for illustrative purposes only and non-limiting.

In may be understood that this Action may be performed before or together with Action 704.

In some embodiments, the refraining in this Action 706 may be based on at least one of: a) the pre-defined rule, b) the priority, such as that obtained in Action 705, and c) the fourth indication obtained from at least one of: the network node 111, and another network node 112.

In some embodiments wherein the refraining in this Action 706 is based on the pre-defined rule and the priority, the communicating in Action 704 of the determined second number N, Nmax, Nmax_dl, Nmax_ul of the blocks of physical channels or signals during the first set of at least partly overlapping time resources, may comprise prioritizing communicating, that is, receiving and/or transmitting, a first block comprising at least a first type of signal or physical channel, over a second block. The second block may, for example, not comprise the first type of signal or physical channel. Alternatively, the second block may comprise the first type of signal or physical channel, but with a lower density in time, frequency, or both, or lower power or power spectrum density, compared to the first block.

For example, when the priority applies for blocks comprising a first signal and/or channel, and/or blocks based on a certain numerology, the wireless device 130 may receive all configured prioritized blocks, e.g., always receive data, and, if/when the capability Nmax_dl allows, receive also the other blocks.

In some examples wherein the second number may be lower than the first number, e.g., if N>Nmax_dl, the wireless device 130 may report an error, to the network node 111 and/or the another node 112, and not receive the third number of blocks.

In a further example, the wireless device 130 may receive at most Nmax_dl blocks in Action 704 and may not attempt to receive the remaining N-Nmax_dl blocks in this Action 706. In other examples, the wireless device 130 may also communicate at a different, e.g., later, time some or all blocks from the remaining plurality of, e.g., N-Nmax_dl, blocks, e.g., in fair share fashion, based on a share factor, or in a best effort.

Embodiments of a method performed by the network node 111, will now be described with reference to the flowchart depicted in panels a) and b) of FIG. 8, each describing a different order in which the actions herein may be performed. The method may be understood to be for handling the communication of blocks of physical channels or signals by the wireless device 130. The network node 111 and the wireless device 130 operate in the wireless communications network 100.

In some embodiments, all the actions may be performed. In some embodiments, one or more actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 8, optional actions are indicated with dashed lines. Some actions may be performed in a different order than that shown in panel a) of FIG. 8, as shown for example in an example in panel b) of FIG. 8.

The detailed description of some of the following corresponds to the same references provided above, in relation to the actions described for the network node 111, and will thus not be repeated here to simplify the description. For example, communication may be understood to be at least one of transmission and reception.

Action 801

In this Action 801, the network node 111 obtains, from the wireless device 130, the first indication of the capability of the wireless device 130 to communicate the maximum number Nmax, Nmax_dl, Nmax_ul of blocks of physical channels or signals, the blocks operating with different numerologies during at least partly overlapping time resources.

The obtaining of the capability Nmax may be based, e.g., on: a message, an indication, or the explicit Nmax received from the the wireless device 130, e.g., upon a request or in unsolicited way, a message received from another node, such as the another node 112, e.g., a core network node or positioning node receives Nmax from BS serving the wireless device 130, a pre-defined rule, e.g., all UEs supporting a certain service may also support a certain Nmax, etc. The capability of the wireless device 130 in terms of Nmax may be received by the network node 111 as a separate message, or it may be received by the network node 111 as part of UE capability information. The network node 111 may also obtain the capability of the wireless device 130 in terms of Nmax, based on historical data or statistics, or observed behavior of the wireless device 130, in terms of selection of blocks of signals when N exceeds Nmax etc.

In some examples, the obtaining in this Action 801 may be implemented by receiving, e.g., via the first link 141.

Action 802

According to some embodiments, in case the wireless device 130 is configured with or may need to receive and/or transmit multiple signals and/or channels based on different numerologies, and the situation N>Nmax may occur, the network node 111 may indicate a priority for at least one signal and/or channel. In agreement with this, in this Action 802, the network node 111 may send the third indication of the priority of the at least one of the physical channels and signals to the wireless device 130.

In some embodiments, the priority may be for the first block comprising at least the first type of signal or physical channel over the second block, wherein the second block may either: a) not comprise the first type of signal or physical channel; or b) comprise the first type of signal or physical channel with a lower density in time, frequency, or both, or lower power or power spectrum density, compared to the first block.

The sending in this Action 802 may be implemented, e.g., via the first link 141.

Action 803

In this Action 803, the network node 111, determines the second indication for communication by the wireless device 130 of the first number N of blocks of physical channels or signals, the blocks operating with different numerologies during the at least partly overlapping time resources. The second indication is at least one of: a configuration and a scheduling. The determining 803 is based on the obtained first indication. That is, the network node 111 may determine the configuration or scheduling of the wireless device 130, e.g., measurements, data and/or control channel transmission to and/or from the wireless device 130, based on the capability of the wireless device 130 to handle multiple numerologies is overlapping time resources.

In some embodiments, the determining in this Action 803 may comprise adapting the first number N of blocks of physical channels or signals, so that no more than the maximum number Nmax, Nmax_dl, Nmax_ul of blocks of physical channels or signals with different numerologies during the at least partly overlapping time resources are scheduled and/or configured by the network node 111. For example, the network node 111 may schedule no more than Nmax different numerologies in the same or overlapping time resources, or scheduling in other time resources otherwise, etc.

In some examples, the network node 111 may control how the wireless device 130 may select and receive and/or transmit the blocks based on different numerologies in case the wireless device 130 is configured with, or may need to receive and/or transmit multiple signals and/or channels based on different numerologies, and the situation N>Nmax may occur. For example, the network node 111 may refrain from transmitting N-Nmax_d blocks of physical channels or signals with different numerologies during the at least partly overlapping time resource if the wireless device 130 has a capability wherein N>Nmax_d.

As mentioned earlier, in some embodiments, a priority may apply for a first block comprising at least a first type of signal or physical channel over a second block, wherein the second block may either: a) not comprise the first type of signal or physical channel; or b) comprise the first type of signal or physical channel with a lower density in time, frequency, or both, or lower power or power spectrum density, compared to the first block.

Action 804

In this Action 804, the network node 111 may initiate sending the determined second indication to the wireless device 130. By doing so, the network node 111 may, e.g., configure one or more operations in the wireless device 130, so that the wireless device 130 is not configured to use more than Nmax numerologies in parallel, e.g., ensuring that N<=Nmax.

Figure 8:
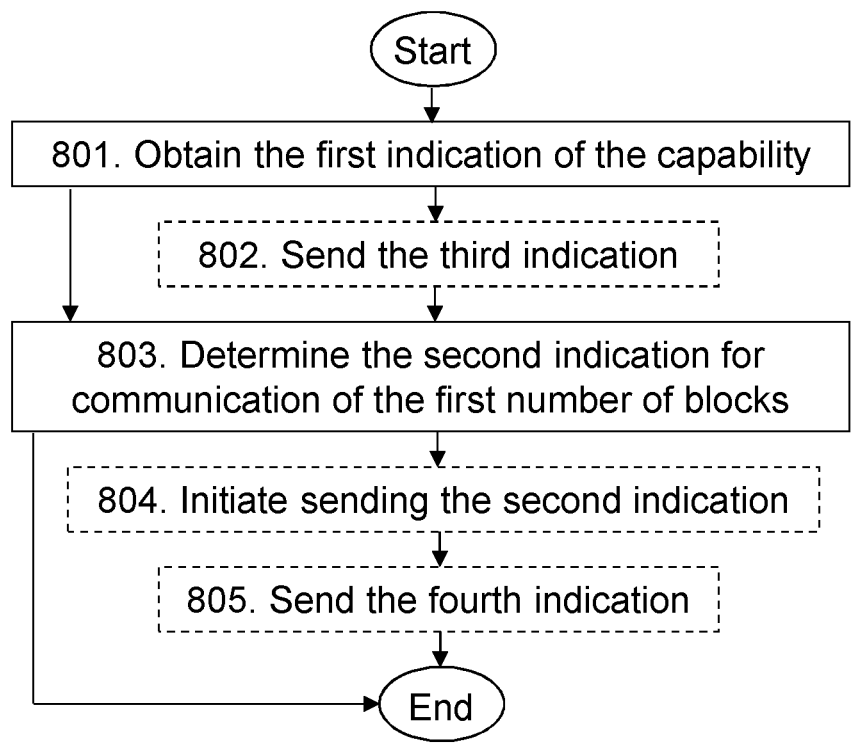
FIG. 8 is a flowchart depicting a method in a network node, according to embodiments herein.
Figure 8:
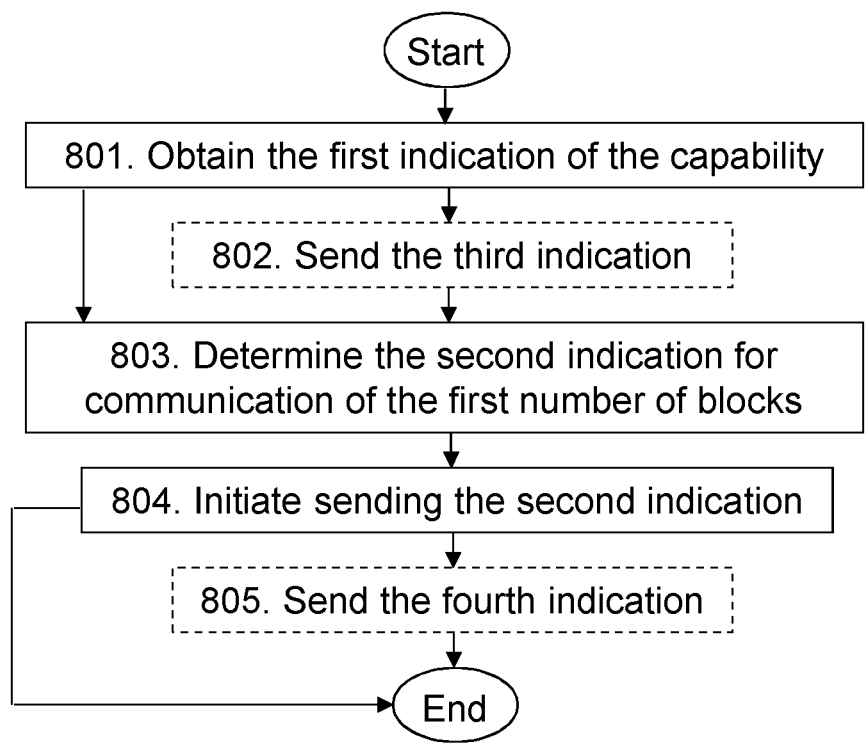

In some examples such as that depicted in panel a) of FIG. 8, wherein the network node 111 may adapt only its own behavior, e.g., DL transmissions, based on the capability of the wireless device 130, this Action may be optional.

In other examples such as that depicted in panel b) of FIG. 8, the network node 111 may alternatively or additionally need to control the transmission and/or reception of blocks at the wireless device 130. In such examples, this Action 804 may be mandatory.

Action 805

In some embodiments, the network node 111 may, in this Action 805, send, to the wireless device 130, a fourth indication. The fourth indication may indicate the configuration for the wireless device 130 to refrain from communicating the third number N-Nmax, N-Nmax_dl, N-Nmax_ul of blocks of physical channels or signals during the first set of at least partly overlapping time resources. The third number may be understood to be equal to the first number N of blocks minus the maximum number Nmax, Nmax_dl, Nmax_ul of blocks.

To refrain may be based on the pre-defined rule and the priority. The communicating of the determined first number N, Nmax, Nmax_dl, Nmax_ul of the blocks of physical channels or signals during the first set of at least partly overlapping time resources in Action 805, may therefore comprise prioritizing communicating a first block comprising at least a first type of signal or physical channel over a second block, the second block: a) not comprising the first type of signal or physical channel; or b) comprising the first type of signal or physical channel with a lower density in time, frequency, or both, or lower power or power spectrum density, compared to the first block.

The sending in this Action 805 may be implemented, e.g., via the first link 141.

Embodiments herein will now be described with some non-limiting examples. In the following description, any reference to a/the UE may be understood to relate to the wireless device 130, and any reference to a/the network node may be understood to relate to the network node 111.

NON-LIMITING ILLUSTRATIVE EXAMPLES OF EMBODIMENTS HEREIN

As a summarized overview, examples of embodiments herein may be understood to relate to the following exemplary embodiments.

In one exemplary embodiment, a UE capable of receiving up to Nmax_dl number of blocks of signals operating with different numerologies, if configured or scheduled, e.g., in Action 702, to receive Nd blocks of signals, where Nd>Nmax_dl, during at least partly overlapping time resources, then based on a pre-defined rule or a priority for receiving different signal blocks, the UE may only receive Nmax_dl blocks, according to Action 704, while discard Nd-Nmax_dl blocks, as per Action 706. For example, the UE may receive, in Action 704, at least one block containing reference signal or signals, e.g., an SS block, and at least one block containing physical channel or channels, e.g., PDSCH if the SS block and the PDSCH are based on different numerologies, but may not, as per Action 706, receive e.g., CSI-RS if it is based on a third numerology.

In another exemplary embodiment, a UE capable of transmitting up to Nmax_ul number of blocks of signals operating with different numerologies, if configured or scheduled to transmit Nu blocks of signals, e.g., in Action 702, where Nu>Nmax_ul, during at least partly overlapping time resources, then, based on a pre-defined rule or a priority for receiving different signal blocks, the UE may only transmit Nmax_ul blocks, according to Action 704, while decide not to transmit Nu-Nmax_ul blocks, as per Action 706. For example, the UE may, in Action 704, transmit at least one block containing a reference signal, e.g., SRS, and at least one block containing a physical channel, e.g., PUSCH, but, as per Action 706, may not transmit another signal/channel, if it is based on a third numerology.

In another exemplary embodiment, a network node may obtain, as described in Action 801, information about the parameters, Nmax_dl and/or Nmax_ul, supported by the UE, and, as described in Action 803, use the obtained information to adapt scheduling of signals and/or configuration of procedures, e.g., CSI measurements, mobility measurements etc. This is to ensure that the UE, e.g., in Action 702, is not configured to transmit and/or receive blocks of signals with different numerologies beyond the UE capability in terms of Nmax_dl and Nmax_ul.

In another embodiment, the UE may, in Action 701, indicate to another node, e.g., the another network node 112, its capability Nmax_dl and/or Nmax_ul. This capability may be used by the network node to e.g., transmit to another UE or network node, or for configuring and/or scheduling at least one of its transmissions, or receptions and/or measurements, and/or UE transmissions, or receptions and/or measurements.

Methods in a UE for Handling Multiple Numerologies in Parallel

Multiple Numerologies in DL

Example Scenario

A UE, as e.g. described in the Terminology section above, capable of receiving in parallel, e.g., during overlapping time resources such as subframes, symbols, slots, minislots, etc., Nmax_dl, where Nmax_dl=1, . . . , blocks of signals based on different numerologies may be, as described in Action 702, configured and/or scheduled to receive signals and/or channels in N blocks, where N>1, . . . , in the same or overlapping time resources, based on N different numerologies, or configured to receive signals and/or channels comprised in the N blocks. It may be noted that a special case of Nmax_dl=1 is when the UE is not capable of receiving multiple blocks in parallel, if they are based on different numerologies. Such UEs may either: a) only support a single numerology over a time period, e.g., a UE performing a measurement based on a first numerology based on multiple instances of reference signals transmitted with the first numerology may not be able to receive other signals with a different numerology until the measurement is complete; or b) may support a single numerology in the frequency domain but may still support multiple numerologies in time domain, that is, not overlapping in time blocks. The parallel reception of blocks herein may be understood to mean receiving two or more blocks, where each block is associated with different numerology, in at least partly overlapping time resources. As special case where all blocks are in overlapping time resources, the numerologies, e.g., subcarrier spacing (SCS), of different blocks may be different, e.g., different blocks have different SCS in frequency domain.

In a first example, if N<=Nmax_dl, the UE may be able to receive, according to Action 704, all N blocks as configured in the at least partly overlapping time resources. If N>Nmax_dl, in a first example, the UE may select, as described earlier in Action 703, at most Nmax_dl blocks to receive, according to Action 704, in at least partly overlapping time resources. The selection may be based on one or more of the following. The selection may be based on a pre-defined rule, as mentioned earlier. For example, the UE may select blocks with certain pre-defined numerologies. In another example, the UE may select at least one block with a reference signal, e.g., SS block, CSI-RS etc, and at least one block with a physical channel, e.g., PDSCH etc. In another example, a block containing an SS block may be of highest priority, and may never be discarded by the UE. In yet another example, a block containing an SS block may be allowed to be discarded by the UE with a certain periodicity, which may be larger than a certain threshold, e.g., discard one block containing SS not more than once every 40 ms. In yet another example of the rule, the UE may receive the block of signals with a physical channel associated with certain numerology, e.g., SCS=30 KHz, provided that the UE has also estimated a CSI for the same numerology, i.e., for SCS=30 KHz.

In some embodiments, the selection may be based on a priority, as discussed earlier. For example, e.g., prioritize a first block comprising at least a first type of signal/channel over a second block not comprising the first type of signal/channel, or comprising the first type of signal/channel but with a lower density in time and/or frequency compared to the first block.

In yet other some embodiments, the selection may be based on a message or configuration received from another node controlling the selection.

If N>Nmax_dl, in a second example, the UE may report an error and not receive the blocks when N>Nmax_dl.

In both the first and second examples, the UE may also indicate to another node such as the another node 112, e.g., radio network node, core network node, positioning node, etc., that the configuration N exceeds UE capability Nmax_dl.

When the UE receives at most Nmax_dl blocks, in a further example, the UE may not attempt to receive the remaining N-Nmax_dl blocks. In another example, the UE may also receive at a different, e.g., later, time some or all blocks from the remaining plurality of, N-Nmax_dl, blocks, e.g., in fair share fashion, based on a share factor, or in a best effort. For example, at time t1 the UE may receive Nmax_dl blocks, at time t2 the UE may receive N-Nmax_dl blocks if N-Nmax_dl<=Nmax_dl or Nmax_dl blocks otherwise, etc. In this example, the total measurement and/or reception time for at least one signal and/or channel comprised in one of the N blocks may be extended and may be determined based on Nmax_dl, e.g., if time T may be needed to receive the at least one signal and/or channel when N<Nmax_dl, the time T*ceil(N/Nmax_dl) may be needed to receive the at least one signal/channel when N>Nmax_dl. This formula may easily be extended to the case when different channels and/or signals may require different time durations T.

In another example, when a priority applies for blocks comprising a first signal and/or channel and/or blocks based on a certain numerology, the UE may receive all configured prioritized blocks, e.g., always receive data, and, if/when the capability Nmax_dl allows, receive also the other blocks.

In a second embodiment, the UE may indicate Nmax_dl, as described in Action 701, to at least one other node, such as the another node 112, e.g., radio network node, core network node, positioning node, etc. Nmax_dl may be the maximum number of numerologies the UE may support in parallel or with frequency-domain multiplexing. The second and the first embodiment may also be combined in some examples.

Multiple Numerologies in UL

The scenario and embodiments described for the DL may also apply for the UL, if the same principles and rules apply for UE transmissions instead of reception/measurements and Nmax_dl is replaced with Nmax_UL in the description above. For example, a scenario may then be read as follows: a UE, as defined in the Terminology section, capable of transmitting in parallel, e.g., during overlapping in time resources such as subframes, symbols, slots, minislots, etc., Nmax_ul, where Nmax_ul=1, . . . , blocks based on different numerologies may be configured and/or scheduled to transmit signals and/or channels in N blocks, N>1, . . . , in the same or overlapping time resources, based on N different numerologies, or configured to transmit signals and/or channels comprised in the N blocks.

Similar to the DL embodiments, the UE capability of Nmax_ul for UE transmissions based on multiple numerologies may also be signalled, in Action 701, to another node, such as the another node 112.

Also, similar priority rules may be applied to UE transmissions as well. If a UE is configured to transmit multiple channels and/or signals in N>Nmax_ul blocks, it may drop N-Nmax_ul blocks, as described in Action 706, and only transmit Nmax_ul blocks. The selection which Nmax_ul blocks to transmit may be based on one or more priority rules on channels and/or signals contained in the blocks. The rules may be pre-defined, or configured by the network node 111. For example, the UE may always transmit one block that contains a reference signal, e.g., SRS, DMRS etc, and one block that contains a physical channel, e.g., PUSCH, PUCCH etc. In yet another example of the priority rule, the UE may transmit Nmax_ul blocks which may require a lowest amount of transmit power.

In another exemplary embodiment, instead of dropping blocks, a UE may just postpone the transmission of blocks, or postpone transmission of some channels and/or signals in a block, and drop other channels and/or signals in the block, e.g., based on a second priority rule. As an example, the blocks which are of lower priority, as described with examples above, may be postponed for transmission by the UE. For example, the block which may require a highest transmit power may be postponed for transmission by the UE.

The embodiments in this section may also be combined with the embodiments described for DL, e.g., the same UE may support Nmax_dl for DL and another Nmax_ul for UL, which may be the same or different from that for DL, etc.

Methods in a Network Node for Controlling UE Operation Related to Multiple Numerologies in Parallel Reference is made to the definition of "network node" in the Terminology section above. Reference is also made to the related UE embodiments.

According to a first group of examples, a network node may obtain the UE's capability Nmax, Nmax_dl and/or Nmax_ul, as described in Action 801, and use it to configure and/or schedule, according to Action 803, one or more UE operations, e.g., UE measurements, data and/or control channel transmission to and/or from the UE. The using may comprise, e.g., configuring one or more UE operations so that the UE is not configured to use more than Nmax numerologies in parallel, e.g., ensuring that N<=Nmax.

According to a second group of examples, the network node may obtain the UE's capability Nmax, as described in Action 801, and use it to configure and/or schedule one or more of network node and/or UE transmissions, so that the UE is not expected to receive/transmit with more than Nmax numerologies in parallel. The configuring and/or scheduling may comprise, e.g., adapting, that is, configuring to not exceed the UE's limit, the numerology of the transmissions the UE may need to receive and/or transmit in parallel, scheduling no more than Nmax different numerologies in the same or overlapping time resources, or scheduling in other time resources otherwise, etc.

According to a third group of examples, the network node may indicate, according to Action 802, a priority for at least one signal and/or channel, in case the UE is configured with or may need to receive and/or transmit multiple signals and/or channels based on different numerologies, and the situation N>Nmax may occur.

According to a fourth group of examples, the network node may control how the UE may select and receive and/or transmit the blocks based on different numerologies in case the UE is configured with, or may need to receive and/or transmit multiple signals and/or channels based on different numerologies, and the situation N>Nmax may occur.

Different groups of examples described herein may also be combined, e.g., Nmax may be used for configuring UE operation, and configuring one or more radio transmissions.

The obtaining of the UE's capability Nmax may be based, e.g., on: a message, an indication, or the explicit Nmax received from the UE, e.g., upon a request or in unsolicited way, message received from another node, such as the another node 112, e.g., a core network node or positioning node receives Nmax from BS serving the UE, a pre-defined rule, e.g., all UEs supporting a certain service may also support a certain Nmax, etc. The UE capability in terms of Nmax may be received by the network node as a separate message, or it may be received by the network node as part of UE capability information. The network node may also obtain the UE capability in terms of Nmax based on historical data or statistics, or observed UE behavior in terms of selection of blocks of signals when N exceeds Nmax etc.

In the above embodiments, the values of parameters Nmax_dl and Nmax_ul supported by the UE may be the same or they may be different.

The network node obtaining Nmax_dl and/or Nmax_ul for a UE, may indicate this obtained capabilities explicitly or implicitly to another UE or another network node.

One or more advantages of embodiments herein may be any of the following. One advantage of embodiments herein may be understood to be that the wireless device 130 may be able to support multiple numerologies in DL and UL while still ensure that the wireless device 130 is able to receive and transmit necessary blocks containing all necessary or important signals. An additional advantage is that the behavior of the wireless device 130 is enabled to be well defined. A further advantage is that the network node 111 is able to optimize scheduling of signals in UL and DL. For example, the scheduling grants are enabled to be utilized more efficiently. Yet another advantage is that procedures, such as mobility, based on measurements, are not adversely affected due to the use of multiple numerology. Furthermore, embodiments herein allow the resources of the wireless communications network 100 to be used more efficiently, allowing the network node 111 and/or the wireless device 130 to refrain from performing actions that may result in wasted resources. Therefore, the capacity of the wireless communications network 100 is increased, its latency decreased, and processing and energy resources used more efficiently.

Figure 9:
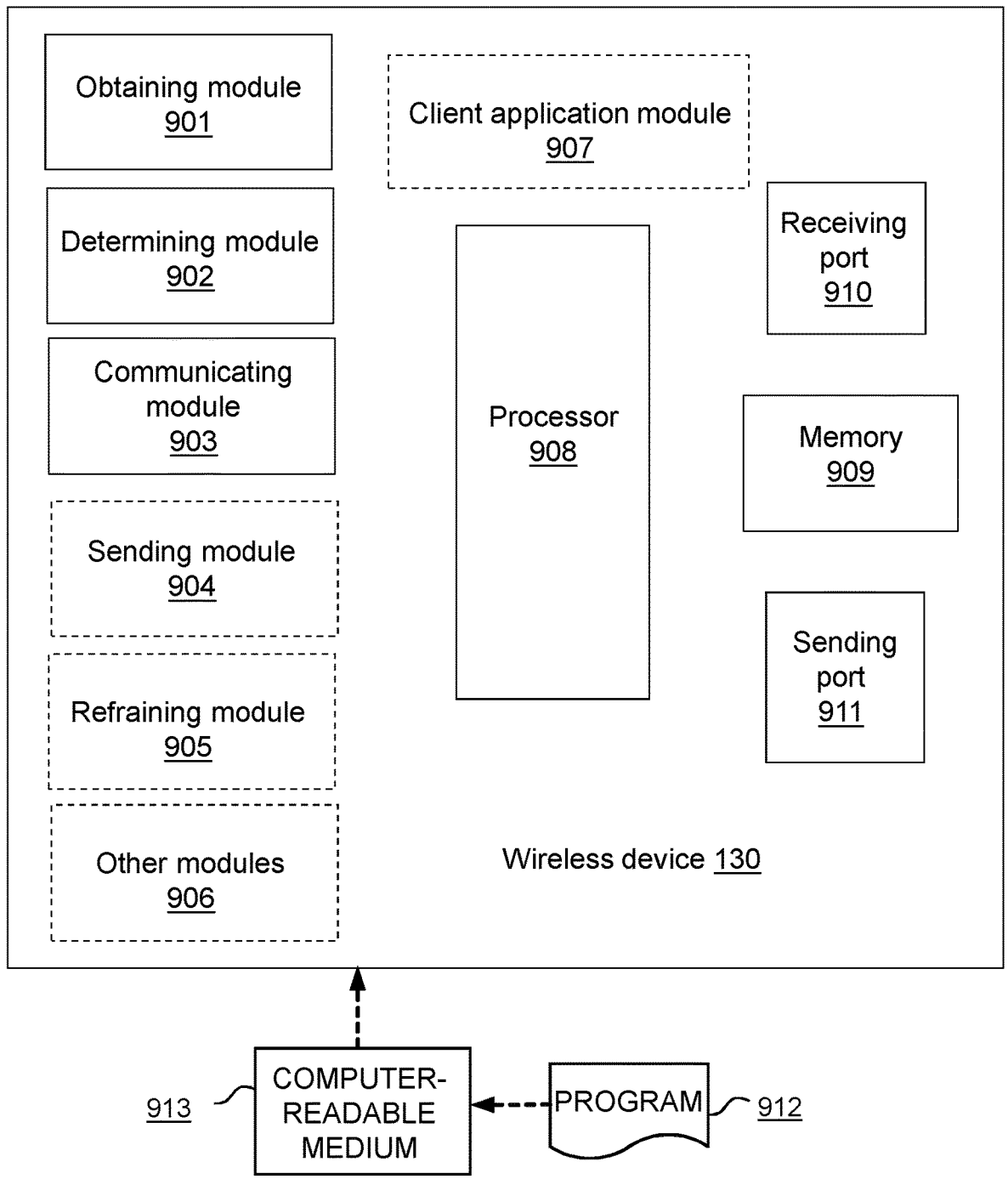
FIG. 9 is a schematic block diagram illustrating embodiments of a wireless device, according to embodiments herein.

To perform the method actions described above in relation to FIG. 7, the wireless device 130 may comprise the following arrangement depicted in FIG. 9. The wireless device 130 is configured to handle the communication of blocks of physical channels or signals. The wireless device 130 is configured to operate in the wireless communications network 100.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

The detailed description of some of the following corresponds to the same references provided above, in relation to the actions described for the wireless device 130 and will thus not be repeated here. For example, to communicate may be understood as to receive or to transmit.

In FIG. 9, optional modules are indicated with dashed boxes.

The wireless device 130 is configured to, e.g. by means of an obtaining module 901 within the wireless device 130 configured to, obtain the indication configured to be for communication of the first number N of blocks of physical channels or signals, the blocks being configured to operate with different numerologies during at least partly overlapping time resources. The indication is configured to be at least one of: a configuration and a scheduling. The obtaining module 901 may be a processor 908 of the wireless device 130, or an application running on such processor.

In some embodiments, the indication may be configured to be obtained from at least one of: the network node 111, and the wireless device 130.

The wireless device 130 is further configured to, e.g. by means of a determining module 902 within the wireless device 130 configured to, determine the second number N, Nmax, Nmax_dl, Nmax_ul of the blocks of physical channels or signals to communicate during the first set of at least partly overlapping time resources. To determine is configured to be based on the indication configured to be obtained, and the capability of the wireless device 130 to communicate the maximum number Nmax, Nmax_dl, Nmax_ul of blocks of physical channels or signals, the blocks being configured to operate with different numerologies during at least partly overlapping time resources. The determining module 902 may be the processor 908 of the wireless device 130, or an application running on such processor.

The wireless device 130 is further configured to, e.g. by means of a communicating module 903 within the wireless device 130 configured to, communicate the second number N, Nmax, Nmax_dl, Nmax_ul, configured to be determined, of the blocks of physical channels or signals during the first set of at least partly overlapping time resources, the blocks being configured to operate with different numerologies during at least partly overlapping time resources. The communicating module 903 may be the processor 908 of the wireless device 130, or an application running on such processor.

In some embodiments, the indication is a second indication, and the wireless device 130 may be configured to, e.g. by means of a sending module 904 within the wireless device 130 configured to, send the first indication of the capability of the wireless device 130 to at least one of: the network node 111, and the another network node 112 being configured to operate in the wireless communications network 100. The sending module 904 may be the processor 908 of the wireless device 130, or an application running on such processor.

The wireless device 130 may be configured to, e.g. by means of a refraining module 905 within the wireless device 130 configured to, refrain from communicating the third number N-Nmax, N-Nmax_dl, N-Nmax_ul of blocks of physical channels or signals during the first set of at least partly overlapping time resources. The third number may be configured to be equal to the first number N of blocks minus the maximum number Nmax, Nmax_dl, Nmax_ul of blocks. The refraining module 905 may be the processor 908 of the wireless device 130, or an application running on such processor.

In some embodiments, to refrain may be configured to be based on at least one of: a) the pre-defined rule, b) the priority, and c) the fourth indication configured to be obtained from at least one of: the network node 111, and another network node 112.

To refrain may be configured to be based on the pre-defined rule and the priority. To communicate the second number N, Nmax, Nmax_dl, Nmax_ul, configured to be determined, of the blocks of physical channels or signals during the first set of at least partly overlapping time resources, may be configured to comprise prioritizing receiving the first block configured to comprise at least the first type of signal or physical channel over the second block. The second block may be configured to: a) not comprise the first type of signal or physical channel; or b) comprise the first type of signal or physical channel with a lower density in time, frequency, or both, or lower power or power spectrum density, compared to the first block.

In some embodiments, the wireless device 130 may be further configured to, e.g. by means of the obtaining module 901, configured to, obtain, from the network node 111, the third indication of the priority of at least one of the physical channels and signals. The wireless device 130 may be configured to perform this obtaining 705 action.

Other modules 906 may be comprised in the wireless device 130.

Figure 10:
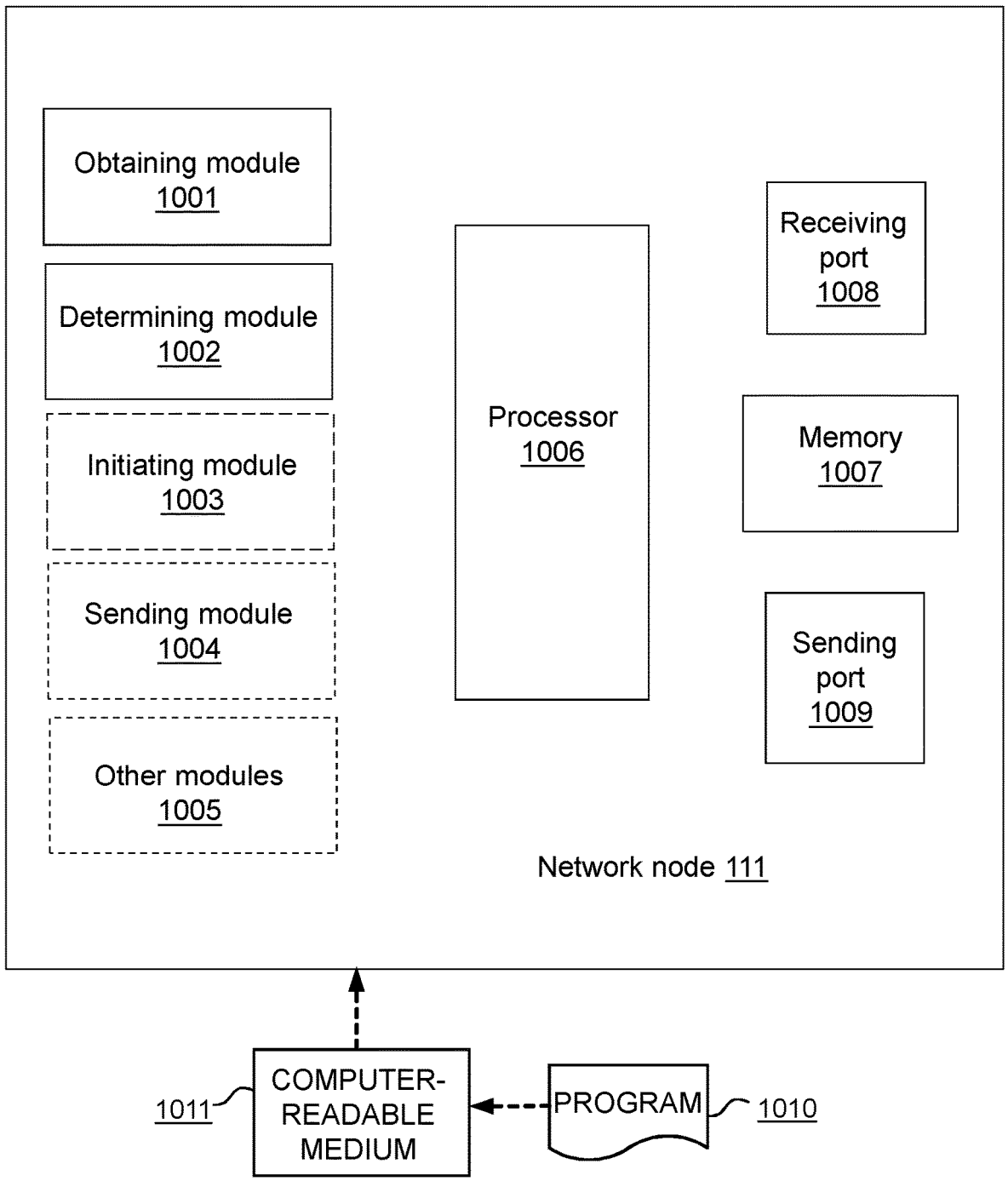
FIG. 10 is a schematic block diagram illustrating embodiments of a network node, according to embodiments herein.

The embodiments herein may be implemented through one or more processors, such as a processor 908 in the wireless device 130 depicted in FIG. 10, together with computer program code for performing the functions and actions of the embodiments herein. The processor 908 may be understood herein as a hardware component, e.g., as processing circuitry. The program code mentioned above may also be provided as a computer program product, for instance in the form of a data carrier carrying computer program code for performing the embodiments herein when being loaded into the in the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 909 comprising one or more memory units. The memory 909 is arranged to be used to store obtained information, store data, configurations, schedulings, and applications etc. to perform the methods herein when being executed in the wireless device 130.

In some embodiments, the wireless device 130 may receive information from the network node 111, the host computer 150, the another network node 112, and/or another node in the wireless communications network 100, through a receiving port 910. In some embodiments, the receiving port 910 may be, for example, connected to one or more antennas in wireless device 130. In other embodiments, the wireless device 130 may receive information from another structure in the wireless communications network 100 through the receiving port 910. Since the receiving port 910 may be in communication with the processor 908, the receiving port 910 may then send the received information to the processor 908. The receiving port 910 may also be configured to receive other information.

The processor 908 in the wireless device 130 may be further configured to transmit or send information to e.g., the network node 111, the host computer 150, the another network node 112, and/or another node in the wireless communications network 100, through a sending port 911, which may be in communication with the processor 908, and the memory 909.

Those skilled in the art will also appreciate that the obtaining module 901, the determining module 902, the communicating module 903, the sending module 904, the refraining module 905, the other modules 906, and the client application module 907 described above may refer to a combination of analog and digital modules, and/or one or more processors configured with software and/or firmware, e.g., stored in memory, that, when executed by the one or more processors such as the processor 908, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 901-907 described above may be implemented as one or more applications running on one or more processors such as the processor 908.

Thus, the methods according to the embodiments described herein for the wireless device 130 may be respectively implemented by means of a computer program 912 product, comprising instructions, i.e., software code portions, which, when executed on at least one processor 908, cause the at least one processor 908 to carry out the actions described herein, as performed by the wireless device 130. The computer program 912 product may be stored on a computer-readable storage medium 913. The computer-readable storage medium 913, having stored thereon the computer program 912, may comprise instructions which, when executed on at least one processor 908, cause the at least one processor 908 to carry out the actions described herein, as performed by the wireless device 130. In some embodiments, the computer-readable storage medium 913 may be a non-transitory computer-readable storage medium, such as a CD ROM disc, a memory stick, or stored in the cloud space. In other embodiments, the computer program 912 product may be stored on a carrier containing the computer program, wherein the carrier is one of an electronic signal, optical signal, radio signal, or the computer-readable storage medium 913, as described above.

The wireless device 130 may comprise an interface unit to facilitate communications between the wireless device 130 and other nodes or devices, e.g., the network node 111, the second network node 112, the host computer 150, or any of the other nodes. In some particular examples, the interface may, for example, include a transceiver configured to transmit and receive radio signals over an air interface in accordance with a suitable standard.

To perform the method actions described above in relation to FIG. 8, the network node 111 may comprise the following arrangement depicted in FIG. 10. The network node 111 is configured to handle the communication of blocks of physical channels or signals by the wireless device 130. The network node 111 and the wireless device 130 are configured to operate in the wireless communications network 100.

The detailed description of some of the following corresponds to the same references provided above, in relation to the actions described for the network node 111, and will thus not be repeated here.

In FIG. 10, optional modules are indicated with dashed boxes. The box with longer dashes indicates that in some embodiments, it may be mandatory.

The network node 111 is configured to, e.g. by means of an obtaining module 1001 within the network node 111 configured to, obtain, from the wireless device 130 the first indication of the capability of the wireless device 130 to communicate the maximum number Nmax, Nmax_dl, Nmax_ul of blocks of physical channels or signals. The blocks are configured to operate with different numerologies during the at least partly overlapping time resources. The obtaining module 1001 may be a processor 1006 of the network node 111, or an application running on such processor.

The network node 111 is configured to, e.g., by means of a determining module 1002 within the network node 111 configured to, determine the second indication for communication by the wireless device 130 of the first number N of blocks of physical channels or signals. The blocks are configured to operate with different numerologies during the at least partly overlapping time resources. The second indication is configured to be at least one of: the configuration and the scheduling. To determine is based on the first indication configured to be obtained. The determining module 1002 may be the processor 1006 of the network node 111, or an application running on such processor.

The network node 111 may be configured to, e.g. by means of an initiating module 1103 within the network node 111 configured to, initiate sending the second indication, configured to be determined, to the wireless device 130. The initiating module 1003 may be the processor 1006 of the network node 111, or an application running on such processor.

The network node 111 may be configured to, e.g. by means of a sending module 1004 within the network node 111 configured to, send the third indication of the priority of at least one of the physical channels and signals, to the wireless device 130. The sending module 1004 may be the processor 1006 of the network node 111, or an application running on such processor.

The network node 111 may be configured to, e.g. by means of the sending module 1004 within the network node 111 configured to, send, to the wireless device 130, the fourth indication. The fourth indication is configured to indicate the configuration for the wireless device 130 to refrain from communicating the third number N-Nmax, N-Nmax_dl, N-Nmax_ul of blocks of physical channels or signals during the first set of at least partly overlapping time resources. The third number is configured to be equal to the first number N of blocks minus the maximum number Nmax, Nmax_dl, Nmax_ul of blocks.

In some embodiments, to refrain may be configured to be based on the pre-defined rule and the priority. To communicate the first number N, Nmax, Nmax_dl, Nmax_ul, configured to be determined, of the blocks of physical channels or signals during the first set of at least partly overlapping time resources, may comprise to prioritize communicating may first block comprising at least the first type of signal or physical channel over the second block. The second block may be configured to: a) not comprise the first type of signal or physical channel; or b) comprise the first type of signal or physical channel with a lower density in time, frequency, or both, or lower power or power spectrum density, compared to the first block.

In some embodiments, to determine may be configured to comprise adapting the first number N of blocks of physical channels or signals so that no more than the maximum number Nmax, Nmax_dl, Nmax_ul of blocks of physical channels or signals with different numerologies during the at least partly overlapping time resources are scheduled and/or configured by the network node 111.

In some embodiments, the priority may be configured to apply for the first block configured to comprise at least the first type of signal or physical channel over the second block. The second block may be configured to: a) not comprise the first type of signal or physical channel; or b) comprise the first type of signal or physical channel with a lower density in time, frequency, or both, or lower power or power spectrum density, compared to the first block.

Other modules 1005 may be comprised in the network node 111.

Figure 11:
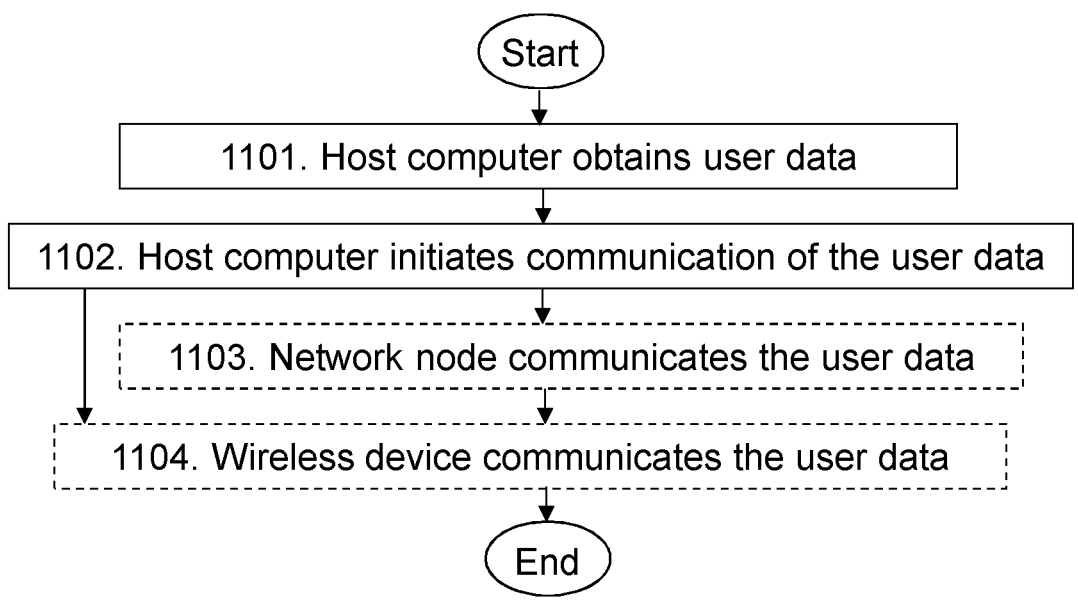
FIG. 11 is a flowchart depicting a method in a host computer, according to embodiments herein.

The embodiments herein may be implemented through one or more processors, such as a processor 1006 in the network node 111 depicted in FIG. 11, together with computer program code for performing the functions and actions of the embodiments herein. The processor 1006 may be understood herein as a hardware component, e.g., as processing circuitry. The program code mentioned above may also be provided as a computer program product, for instance in the form of a data carrier carrying computer program code for performing the embodiments herein when being loaded into the in the network node 111. One such carrier may be in the form of a CD ROM disc. It is however feasible with other data carriers such as a memory stick. The computer program code may furthermore be provided as pure program code on a server and downloaded to the network node 111.

The network node 111 may further comprise a memory 1007 comprising one or more memory units. The memory 1007 is arranged to be used to store obtained information, store data, configurations, schedulings, and applications etc. to perform the methods herein when being executed in the network node 111.

In some embodiments, the network node 111 may receive information from the wireless device 130, the host computer 150, the another network node 112, and/or another node in the wireless communications network 100, through a receiving port 1008. In some embodiments, the receiving port 1008 may be, for example, connected to one or more antennas in network node 111. In other embodiments, the network node 111 may receive information from another structure in the wireless communications network 100 through the receiving port 1008. Since the receiving port 1008 may be in communication with the processor 1006, the receiving port 1008 may then send the received information to the processor 1006. The receiving port 1008 may also be configured to receive other information.

The processor 1006 in the network node 111 may be further configured to transmit or send information to e.g., the wireless device 130, the host computer 150, the another network node 112, and/or another node in the wireless communications network 100, through a sending port 1009, which may be in communication with the processor 1006, and the memory 1007.

Those skilled in the art will also appreciate that the obtaining module 1001, the determining module 1002, the initiating module 1003, the sending module 1004 and the other modules 1005 described above may refer to a combination of analog and digital modules, and/or one or more processors configured with software and/or firmware, e.g., stored in memory, that, when executed by the one or more processors such as the processor 1006, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1001-1005 described above may be implemented as one or more applications running on one or more processors such as the processor 1006.

Thus, the methods according to the embodiments described herein for the network node 111 may be respectively implemented by means of a computer program 1010 product, comprising instructions, i.e., software code portions, which, when executed on at least one processor 1006, cause the at least one processor 1006 to carry out the actions described herein, as performed by the network node 111. The computer program 1010 product may be stored on a computer-readable storage medium 1011. The computer-readable storage medium 1011, having stored thereon the computer program 1010, may comprise instructions which, when executed on at least one processor 1006, cause the at least one processor 1006 to carry out the actions described herein, as performed by the network node 111. In some embodiments, the computer-readable storage medium 1011 may be a non-transitory computer-readable storage medium, such as a CD ROM disc, a memory stick, or stored in the cloud space. In other embodiments, the computer program 1010 product may be stored on a carrier containing the computer program, wherein the carrier is one of an electronic signal, optical signal, radio signal, or the computer-readable storage medium 1011, as described above.

The network node 111 may comprise an interface unit to facilitate communications between the network node 111 and other nodes or devices, e.g., the second network node 112, the wireless device 130, the host computer 150, or any of the other nodes. In some particular examples, the interface may, for example, include a transceiver configured to transmit and receive radio signals over an air interface in accordance with a suitable standard.

Further Extensions and Variations

A method performed by the communications system 180 may comprise one or more of the following actions. The communications system 180 may comprise the host computer 150, and at least one of the network node 111, and the wireless device 130.

In some embodiments all the actions may be performed. In some embodiments, one or more actions may be performed. One or more embodiments may be combined, where applicable. Particularly, it may be understood that any of the Actions, features or embodiments described thus far may be combined with the actions of the method in the communications system 180 described below. All possible combinations are not described to simplify the description. In FIG. 10, optional actions are indicated with dashed lines. Some actions may be performed in a different order than that shown in FIG. 11. For example, since communication may be any of reception of transmission, the actions may be performed in the opposite order than that depicted in FIG. 11.

Action 1101

In this Action 1101, the communications system 180 may obtain, at the host computer 150, user data for a user of the wireless device 130.

Action 1102

In this Action 1102, the communications system 180 may initiate communication, at the host computer 150, of the user data to or from the wireless device 130.

Action 1103

In this Action 1103, the communications system 180 may communicate, at the network node 111, the user data between the host computer 150 and the wireless device 130. The network node 111 may further perform the Action 801 of obtaining, from the wireless device 130, the first indication of the capability of the wireless device 130 to communicate the maximum number Nmax, Nmax_dl, Nmax_ul of blocks of physical channels or signals, the blocks operating with different numerologies during at least partly overlapping time resources. The network node 111 may further perform the Action 803 of determining the second indication for communication by the wireless device 130 of the first number N of blocks of physical channels or signals, the blocks operating with different numerologies during at least partly overlapping time resources; the second indication may be at least one of: the configuration and the scheduling, and the determining 803 being based on the obtained first indication.

Action 1104

In this Action 1104, the communications system 180 may communicate, at the another wireless device 130, the user data to or from the host computer 150. The wireless device 130 may further perform the Action 702 of obtaining the indication for communication of the first number N of blocks of physical channels or signals, the blocks operating with different numerologies during the at least partly overlapping time resources; the indication may be at least one of: the configuration and the scheduling.

The wireless device 130 may further perform the Action 703 of determining the second number N, Nmax, Nmax_dl, Nmax_ul of the blocks of physical channels or signals to communicate during the first set of at least partly overlapping time resources; the determining 703 may be based on the obtained indication and the capability of the wireless device 130 to communicate the maximum number Nmax, Nmax_dl, Nmax_ul of blocks of physical channels or signals, the blocks operating with different numerologies during at least partly overlapping time resources.

The wireless device 130 may further perform the Action 704 of communicating the determined second number N, Nmax, Nmax_dl, Nmax_ul of the blocks of physical channels or signals during the first set of at least partly overlapping time resources, the blocks operating with different numerologies during at least partly overlapping time resources.

As stated earlier, communicating may mean herein any of receiving or transmitting. Similarly, communication may be transmission or reception. It may be understood that if the host computer 150 initiates communication, wherein communication is transmission, the communicating 903 at the network node 111 may comprise receiving from the host computer 150 and transmitting to the wireless device 130, and the communicating 904 at the wireless device 130 may comprise receiving. Likewise, it may be understood that if the host computer 150 initiates communication, wherein communication is reception, the communicating 903 at the network node 111 may comprise receiving from the wireless device 130 and transmitting to the host computer 150, and the communicating 904 at the wireless device 130 may comprise transmitting.

To perform the method actions described above in relation to FIG. 11, the communications system 180 may be configured comprise the network node 111, the wireless device 130 and the host computer 150.

The communications system 180 may be configured to obtain, at the host computer 150, the user data for the user of the wireless device 130. The communications system 180 may be further configured to initiate communication, at the host computer 150, of the user data to or from the wireless device 130.

Figure 12:
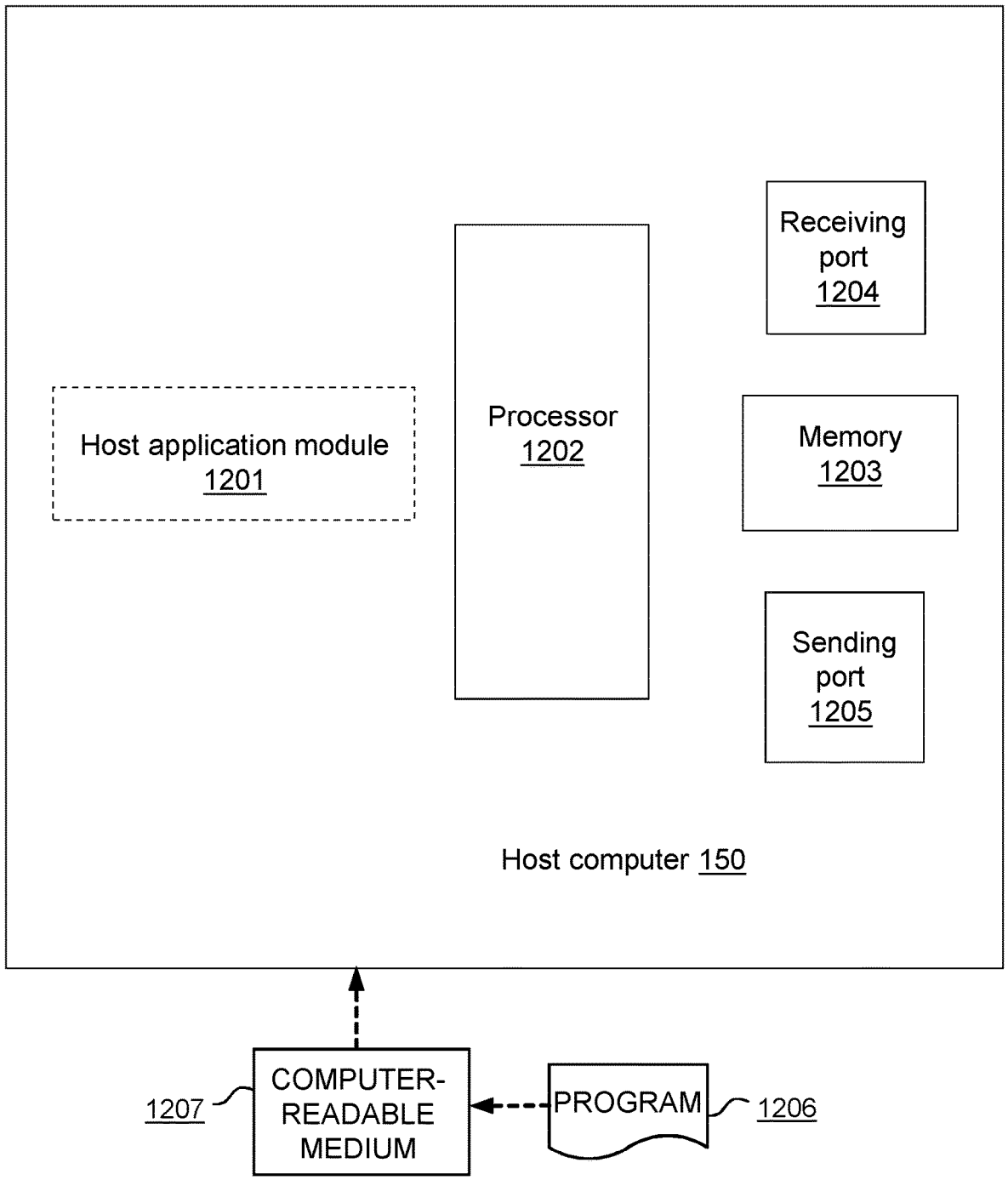
FIG. 12 is a schematic block diagram illustrating embodiments of a host computer, according to embodiments herein.

To perform the method actions described above in relation to FIG. 11, the host computer 150 may comprise the following arrangement depicted in FIG. 12.

The detailed description of some of the following corresponds to the same references provided above, in relation to the actions described for the network node 111, and the wireless device 130, and will thus not be repeated here.

The host computer 150 may be configured to, e.g. by means of a host application module 1201 within the host computer 150 configured to, obtain, at the host computer 150, the user data for the user of the wireless device 130. The host application module 1201 may be a processor 1202 of the host computer 150, or an application running on such processor.

The host computer 150 may be configured to, e.g. by means of the host application module 1201 within the host computer 150 configured to, initiate communication, at the host computer 150, of the user data to or from the wireless device 130. The host computer 150 may be configured to perform this initiating action, e.g. by means of the host application module 1201 within the host computer 150, configured to perform this action. The host application module 1201 may be the processor 1202 of the host computer 150, or an application running on such processor.

The embodiments herein may be implemented through one or more processors, such as a processor 1202 in the host computer 150 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the host computer 150. One such carrier may be in the form of a CD ROM disc. It is however feasible with other data carriers such as a memory stick. The computer program code may furthermore be provided as pure program code on a server and downloaded to the host computer 150.

The host computer 150 may further comprise a memory 1203 comprising one or more memory units. The memory 1203 is arranged to be used to store obtained information, store data, configurations, schedulings, and applications etc. to perform the methods herein when being executed in the host computer 150.

In some embodiments, the host computer 150 may receive information from the wireless device 130, the network node 111, the another network node 112, and/or another node in the wireless communications network 100 or another telecommunications network, such as an intermediate network, through a receiving port 1204. In some embodiments, the receiving port 1204 may be, for example, connected to one or more antennas in host computer 150. In other embodiments, the host computer 150 may receive information from another structure in the wireless communications network 100 through the receiving port 1204. Since the receiving port 1204 may be in communication with the processor 1202, the receiving port 1204 may then send the received information to the processor 1202. The receiving port 1204 may also be configured to receive other information.

The processor 1202 in the host computer 150 may be further configured to transmit or send information to e.g., the wireless device 130, the network node 111, the another network node 112, and/or another node in the wireless communications network 100 or another telecommunications network, such as an intermediate network, through a sending port 1205, which may be in communication with the processor 1202, and the memory 1203.

Those skilled in the art will also appreciate that the host application module 1201 described above may refer to a combination of analog and digital modules, and/or one or more processors configured with software and/or firmware, e.g., stored in memory, that, when executed by the one or more processors such as the processor 1202, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the host application module 1201 described above may be implemented as one or more applications running on one or more processors such as the processor 1202.

Thus, the methods according to the embodiments described herein for the host computer 150 may be respectively implemented by means of a computer program 1206 product, comprising instructions, i.e., software code portions, which, when executed on at least one processor 1202, cause the at least one processor 1202 to carry out the actions described herein, as performed by the host computer 150. The computer program 1206 product may be stored on a computer-readable storage medium 1207. The computer-readable storage medium 1207, having stored thereon the computer program 1206, may comprise instructions which, when executed on at least one processor 1202, cause the at least one processor 1202 to carry out the actions described herein, as performed by the host computer 150. In some embodiments, the computer-readable storage medium 1207 may be a non-transitory computer-readable storage medium, such as a CD ROM disc, a memory stick, or stored in the cloud space. In other embodiments, the computer program 1206 product may be stored on a carrier containing the computer program, wherein the carrier is one of an electronic signal, optical signal, radio signal, or the computer-readable storage medium 1207, as described above.

The host computer 150 may comprise an interface unit to facilitate communications between the host computer 150 and other nodes or devices, e.g., the first network node 111, the wireless device 130, or any of the other nodes in the wireless communications network 100. In some particular examples, the interface may, for example, include a transceiver configured to transmit and receive radio signals over an air interface in accordance with a suitable standard.

The communications system 180 may be further configured to at least one of:

a) communicate, at the network node 111, the user data between the host computer 150 and the wireless device 130, wherein the network node 111 is further configured to:

i) obtain, from the wireless device 130 the first indication of the capability of the wireless device 130 to communicate a maximum number Nmax, Nmax_dl, Nmax_ul of blocks of physical channels or signals, the blocks being configured to operate with different numerologies during at least partly overlapping time resources, and ii) determine the second indication for communication by the wireless device 130 of the first number N of blocks of physical channels or signals, the blocks being configured to operate with different numerologies during at least partly overlapping time resources, the second indication being configured to be at least one of: the configuration and the scheduling, wherein to determine is configured to be based on the first indication configured to be obtained; and b) communicate, at the wireless device 130, the user data to or from the host computer 150, wherein the wireless device 130 is further configured to:

iii) obtain the indication for communication of the first number N of blocks of physical channels or signals, the blocks being configured to operate with different numerologies during at least partly overlapping time resources, the indication being configured to be at least one of: the configuration and the scheduling, iv) determine the second number N, Nmax, Nmax_dl, Nmax_ul of the blocks of physical channels or signals to communicate during the first set of at least partly overlapping time resources, wherein to determine is configured to be based on the indication configured to be obtained, and the capability of the wireless device 130 to communicate the maximum number Nmax, Nmax_dl, Nmax_ul of blocks of physical channels or signals, the blocks being configured to operate with different numerologies during at least partly overlapping time resources, and v) communicate the second number N, Nmax, Nmax_dl, Nmax_ul, configured to be determined, of the blocks of physical channels or signals during the first set of at least partly overlapping time resources, the blocks being configured to operate with different numerologies during at least partly overlapping time resources.

To perform the method actions described above in relation to FIG. 11, the network node 111 may be configured to perform the communicating Action 1103, e.g. by means of the other modules 1105 within the network node 111, configured to communicate, at the network node 111, the user data between the host computer 150 and the wireless device 130.

The network node 111 may be configured to perform the other actions as described before. For example, the network node 111 may be further configured to:

i) obtain, from the wireless device 130 the first indication of the capability of the wireless device 130 to communicate a maximum number Nmax, Nmax_dl, Nmax_ul of blocks of physical channels or signals, the blocks being configured to operate with different numerologies during at least partly overlapping time resources, and ii) determine the second indication for communication by the wireless device 130 of the first number N of blocks of physical channels or signals, the blocks being configured to operate with different numerologies during at least partly overlapping time resources, the second indication being configured to be at least one of: the configuration and the scheduling, wherein to determine is configured to be based on the first indication configured to be obtained.

The network node 111 may also be configured to perform any of the other actions described in relation to FIG. 8, as described before.

To perform the method actions described above in relation to FIG. 11, the wireless device 130 may be configured to perform the communicating action 1105, e.g. by means of the client application module 907 within the wireless device 130, configured to communicate, at the wireless device 130, the user data to or from the host computer 150. The wireless device 130 may be configured to perform the other actions as described before. For example, the wireless device 130 may be further configured to:

iii) obtain the indication for communication of the first number N of blocks of physical channels or signals, the blocks being configured to operate with different numerologies during at least partly overlapping time resources, the indication being configured to be at least one of: the configuration and the scheduling, iv) determine the second number N, Nmax, Nmax_dl, Nmax_ul of the blocks of physical channels or signals to communicate during the first set of at least partly overlapping time resources, wherein to determine is configured to be based on the indication configured to be obtained, and the capability of the wireless device 130 to communicate the maximum number Nmax, Nmax_dl, Nmax_ul of blocks of physical channels or signals, the blocks being configured to operate with different numerologies during at least partly overlapping time resources, and v) communicate the second number N, Nmax, Nmax_dl, Nmax_ul, configured to be determined, of the blocks of physical channels or signals during the first set of at least partly overlapping time resources, the blocks being configured to operate with different numerologies during at least partly overlapping time resources.

Figure 7:
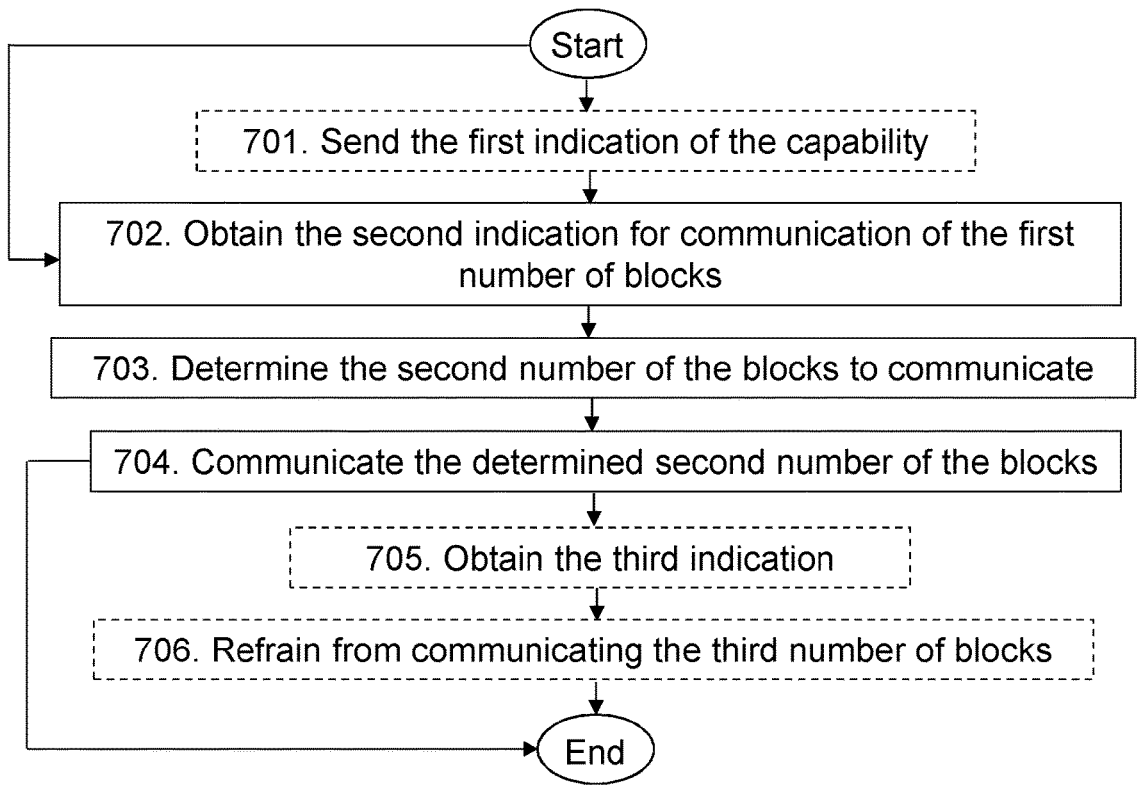
FIG. 7 is a flowchart depicting embodiments of a method in a wireless device, according to embodiments herein.
Figure 7:
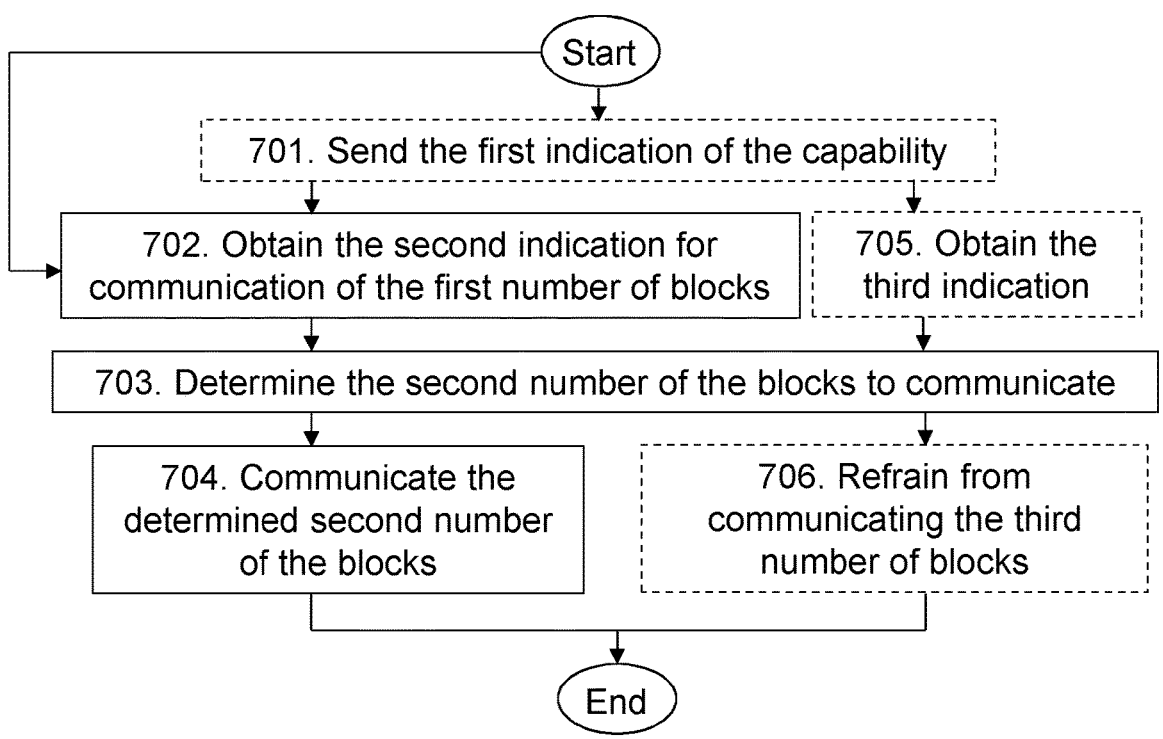

The wireless device 130 may also be configured to perform any of the other actions described in relation to FIG. 7, as described before.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method, performed by a wireless device, for handling a communication of blocks of physical channels or signals, the wireless device operating in a wireless communications network, the method comprising:
obtaining an indication for communication of a first number of blocks of physical channels or signals, the blocks operating with different numerologies during at least partly overlapping time resources, the indication being at least one of: a configuration and a scheduling,
determining a second number of the blocks of physical channels or signals to communicate during a first set of at least partly overlapping time resources, the determining being based on the obtained indication and a capability of the wireless device to communicate a maximum number of blocks of physical channels or signals, the blocks operating with different numerologies during at least partly overlapping time resources, and
communicating the determined second number of the blocks of physical channels or signals during the first set of at least partly overlapping time resources, the blocks operating with different numerologies during at least partly overlapping time resources.

2. The method of claim 1, the method further comprising:
refraining from communicating a third number of blocks of physical channels or signals during the first set of at least partly overlapping time resources, the third number being equal to the first number of blocks minus the maximum number of blocks.

3. The method of claim 2, wherein the refraining is based on at least one of:
a) a pre-defined rule, b) a priority, and c) a fourth indication obtained from at least one of: the network node, and another network node.

4. The method of claim 3, wherein the refraining is based on the pre-defined rule and the priority, wherein the communicating of the determined second number of the blocks of physical channels or signals during the first set of at least partly overlapping time resources, comprises prioritizing receiving a first block comprising at least a first type of signal or physical channel over a second block, the second block:
not comprising the first type of signal or physical channel; or
comprising the first type of signal or physical channel with a lower density in time, frequency, or both, or lower power or power spectrum density, compared to the first block.

5. The method of claim 1, wherein the indication is a second indication, and wherein the method further comprises:
sending a first indication of the capability of the wireless device to at least one of: the network node, and another network node operating in the wireless communications network.

6. The method of claim 1, the method further comprising:
obtaining, from the network node a third indication of a priority of at least one of the physical channels and signals.

7. A method, performed by a network node, for handling a communication of blocks of physical channels or signals by a wireless device, the network node and the wireless device operating in a wireless communications network, the method comprising:
obtaining, from the wireless device a first indication of the capability of the wireless device to communicate a maximum number of blocks of physical channels or signals, the blocks operating with different numerologies during at least partly overlapping time resources,
determining a second indication for communication by the wireless device of a first number of blocks of physical channels or signals, the blocks operating with different numerologies during at least partly overlapping time resources, the second indication being at least one of: a configuration and a scheduling, and the determining being based on the obtained first indication, and
sending, to the wireless device, a third indication, the third indication indicating a configuration for the wireless device to refrain from communicating a third number of blocks of physical channels or signals during the first set of at least partly overlapping time resources, the third number being equal to the first number of blocks minus the maximum number of blocks.

8. The method of claim 7, further comprising:
initiating sending the determined second indication to the wireless device.

9. The method of claim 7, further comprising:
sending a fourth indication to the wireless device, the fourth indication indicating a priority of at least one of the physical channels and signals to the wireless device.

10. The method of claim 7, wherein to refrain is based on the pre-defined rule and a priority, wherein the communicating of the determined first number of the blocks of physical channels or signals during the first set of at least partly overlapping time resources, comprises prioritizing communicating a first block comprising at least a first type of signal or physical channel over a second block, the second block:
not comprising the first type of signal or physical channel; or
comprising the first type of signal or physical channel with a lower density in time, frequency, or both, or lower power or power spectrum density, compared to the first block.

11. The method of claim 7, wherein the determining comprises adapting the first number of blocks of physical channels or signals so that no more than the maximum number of blocks of physical channels or signals with different numerologies during the at least partly overlapping time resources are scheduled and/or configured by the network node.

12. The method of claim 11, wherein a priority applies for a first block comprising at least a first type of signal or physical channel over a second block, the second block:
not comprising the first type of signal or physical channel; or
comprising the first type of signal or physical channel with a lower density in time, frequency, or both, or lower power or power spectrum density, compared to the first block.

13. A wireless device configured to handle a communication of blocks of physical channels or signals, the wireless device being configured to operate in a wireless communications network, the wireless device being further configured to:
obtain an indication for communication of a first number of blocks of physical channels or signals, the blocks being configured to operate with different numerologies during at least partly overlapping time resources, the indication being at least one of: a configuration and a scheduling,
determine, based on the obtained indication and a capability of the wireless device to communicate a maximum number of blocks of physical channels or signals, a second number of the blocks of physical channels or signals to communicate during a first set of at least partly overlapping time resources, the blocks being configured to operate with different numerologies during at least partly overlapping time resources, and
communicate the second number of the blocks of physical channels or signals during the first set of at least partly overlapping time resources, the blocks being configured to operate with different numerologies during at least partly overlapping time resources.

14. The wireless device of claim 13, being further configured to:
refrain from communicating a third number of blocks of physical channels or signals during the first set of at least partly overlapping time resources, the third number being equal to the first number of blocks minus the maximum number of blocks.

15. The wireless device of claim 14, wherein the wireless device is configured to refrain from communicating the third number based on at least one of: a) a pre-defined rule, b) a priority, and c) a fourth indication configured to be obtained from at least one of: the network node, and another network node.

16. The wireless device of claim 15, wherein the wireless device is configured to refrain from communicating the third number based on the pre-defined rule and the priority, and wherein the wireless device is configured to communicate the second number of the blocks of physical channels or signals during the first set of at least partly overlapping time resources by prioritizing receiving a first block configured to comprise at least a first type of signal or physical channel over a second block, the second block being configured to:
not comprise the first type of signal or physical channel; or
comprise the first type of signal or physical channel with a lower density in time, frequency, or both, or lower power or power spectrum density, compared to the first block.

17. The wireless device of claim 13, wherein the indication is a second indication, and wherein the wireless device is further configured to:
send a first indication of the capability of the wireless device to at least one of: the network node, and another network node configured to operate in the wireless communications network.

18. The wireless device of claim 13, the wireless device being further configured to:
obtain, from the network node a third indication of a priority of at least one of the physical channels and signals.

19. A network node configured to handle a communication of blocks of physical channels or signals by a wireless device, the network node and the wireless device being configured to operate in a wireless communications network, the network node being further configured to:
obtain, from the wireless device a first indication of the capability of the wireless device to communicate a maximum number of blocks of physical channels or signals, the blocks being configured to operate with different numerologies during at least partly overlapping time resources,
determine, based on the obtained first indication, a second indication for communication by the wireless device of a first number of blocks of physical channels or signals, the blocks being configured to operate with different numerologies during at least partly overlapping time resources, the second indication comprising at least one of: a configuration and a scheduling, and
send, to the wireless device, a third indication, the third indication indicating a configuration for the wireless device to refrain from communicating a third number of blocks of physical channels or signals during the first set of at least partly overlapping time resources, the third number being equal to the first number of blocks minus the maximum number of blocks.

20. The network node of claim 19, being further configured to:
initiate sending the determined second indication to the wireless device.

21. The network node of claim 19, being further configured to:
send a fourth indication to the wireless device, the fourth indication indicating a priority of at least one of the physical channels and signals.

22. The network node of claim 19, wherein to determine is comprises adapting the first number of blocks of physical channels or signals so that no more than the maximum number of blocks of physical channels or signals with different numerologies during the at least partly overlapping time resources are scheduled and/or configured by the network node.

23. The network node of claim 22, wherein a priority applies for a first block comprising at least a first type of signal or physical channel over a second block, the second block being configured to:
not comprise the first type of signal or physical channel; or
comprise the first type of signal or physical channel with a lower density in time, frequency, or both, or lower power or power spectrum density, compared to the first block.

* * * * *